US007958720B2

(12) United States Patent
Okamoto et al.

(10) Patent No.: US 7,958,720 B2
(45) Date of Patent: Jun. 14, 2011

(54) COMBUSTION CONTROL APPARATUS FOR DIRECT-INJECTION SPARK-IGNITION INTERNAL COMBUSTION ENGINE

(75) Inventors: Shinichi Okamoto, Yokohama (JP); Masayuki Tomita, Kanagawa (JP); Taizo Horikomi, Kanagawa (JP); Taro Sakai, Kanagawa (JP); Akira Nakajima, Yokohama (JP); Hitoshi Ishii, Kanagawa (JP); Mitsuhiro Akagi, Yokohama (JP); Takao Maitani, Kanagawa (JP); Tomoyuki Takeda, Yokohama (JP); Masatoshi Hidaka, Yokohama (JP); Tomoyuki Shigefuji, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1206 days.

(21) Appl. No.: 11/443,179

(22) Filed: May 31, 2006

(65) Prior Publication Data
US 2006/0266020 A1    Nov. 30, 2006

(30) Foreign Application Priority Data

May 31, 2005 (JP) ................................. 2005-158507
May 31, 2005 (JP) ................................. 2005-158509
May 31, 2005 (JP) ................................. 2005-158510
Jun. 27, 2005 (JP) ................................. 2005-185909

(51) Int. Cl.
*F01N 3/00* (2006.01)
*F01N 3/10* (2006.01)
(52) U.S. Cl. ............... 60/284; 60/274; 60/285; 60/299; 60/300
(58) Field of Classification Search ............ 60/284–285, 60/273, 295, 299, 274, 300
See application file for complete search history.

(56) References Cited

U.S. PATENT DOCUMENTS

| | | | |
|---|---|---|---|
| 6,112,716 A * | 9/2000 | Tachibana .................. 123/305 |
| 6,212,879 B1 | 4/2001 | Nishimura et al. |
| 6,318,074 B1 | 11/2001 | Nishimura et al. |
| 6,345,499 B1 | 2/2002 | Nishimura et al. |
| 6,668,547 B2 * | 12/2003 | Paland ......................... 60/285 |
| 6,684,630 B2 | 2/2004 | Uchida et al. |
| 6,718,928 B2 * | 4/2004 | Brueggen et al. ......... 123/179.5 |
| 7,073,479 B2 | 7/2006 | Köhler et al. |
| 7,114,326 B2 * | 10/2006 | Mukaihira et al. ............ 60/277 |
| 7,198,952 B2 * | 4/2007 | Uchida et al. ................. 436/37 |

(Continued)

FOREIGN PATENT DOCUMENTS

DE    103 05 941 A1    8/2004

(Continued)

OTHER PUBLICATIONS

U.S. Appl. No. 11/443,178, filed May 31, 2006, Yasunaga et al.

(Continued)

*Primary Examiner* — Thomas E Denion
*Assistant Examiner* — Audrey Klasterka
(74) *Attorney, Agent, or Firm* — Foley & Lardner LLP

(57) ABSTRACT

A combustion control apparatus is configured for a direct-injection spark-ignition internal combustion engine. The combustion control apparatus selects an extremely retarded combustion mode while the internal combustion engine is in a predetermined operating state. In the extremely retarded combustion mode, the combustion control apparatus sets ignition timing to be after compression top dead center, and sets fuel injection timing to be before the ignition timing and after compression top dead center. The combustion control apparatus inhibits the extremely retarded combustion mode while an exhaust purifier of the internal combustion engine is in a predetermined cold state.

21 Claims, 17 Drawing Sheets

U.S. PATENT DOCUMENTS

| | | |
|---|---|---|
| 2004/0163379 A1* | 8/2004 | Pott et al. .................. 60/284 |
| 2005/0161020 A1 | 7/2005 | Tomita |
| 2006/0000440 A1 | 1/2006 | Kohler et al. |
| 2006/0065235 A1 | 3/2006 | Tomita et al. |

FOREIGN PATENT DOCUMENTS

| | | |
|---|---|---|
| EP | 1 158 150 A2 | 11/2001 |
| EP | 1158150 A2 * | 11/2001 |
| EP | 1 515 015 (A2) | 3/2005 |
| EP | 1 643 107 A1 | 4/2006 |
| JP | 3-246335 (A) | 11/1991 |
| JP | 6-159109 (A) | 6/1994 |
| JP | 8-303337 (A) | 11/1996 |
| JP | 9-96214 (A) | 4/1997 |
| JP | 9-310636 (A) | 12/1997 |
| JP | 10-153138 (A) | 6/1998 |
| JP | 10-317950 (A) | 12/1998 |
| JP | 11-107838 (A) | 4/1999 |
| JP | 11-294220 A | 10/1999 |
| JP | 11-343832 (A) | 12/1999 |
| JP | 2000-073820 (A) | 3/2000 |
| JP | 3325230 B2 | 7/2002 |
| JP | 2002-235592 (A) | 8/2002 |
| JP | 2002-295287 (A) | 10/2002 |
| JP | 2004-036461 A | 2/2004 |
| JP | 2004-360526 (A) | 12/2004 |
| JP | 2005-48701 (A) | 2/2005 |
| JP | 2005-083352 (A) | 3/2005 |
| JP | 2005-113885 (A) | 4/2005 |
| WO | WO/2004/072461 A1 | 8/2004 |

OTHER PUBLICATIONS

U.S. Appl. No. 11/246,189, filed Oct. 11, 2005, Takeda et al.

* cited by examiner

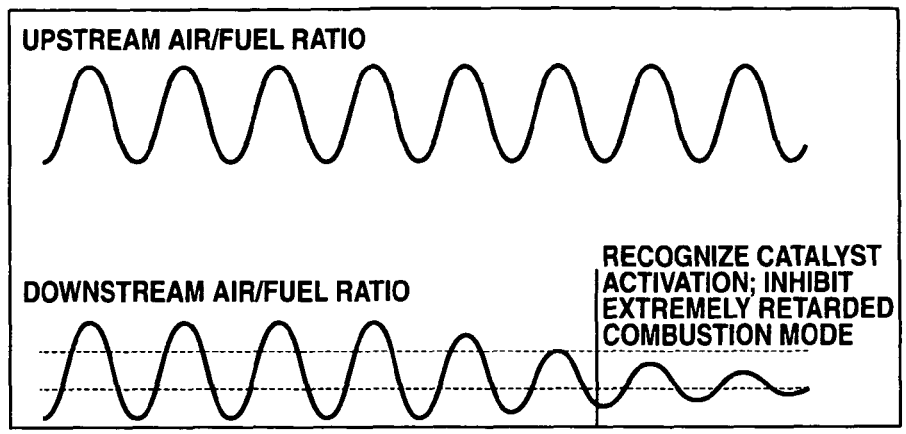
FIG.20A
FIG.20B
FIG.21
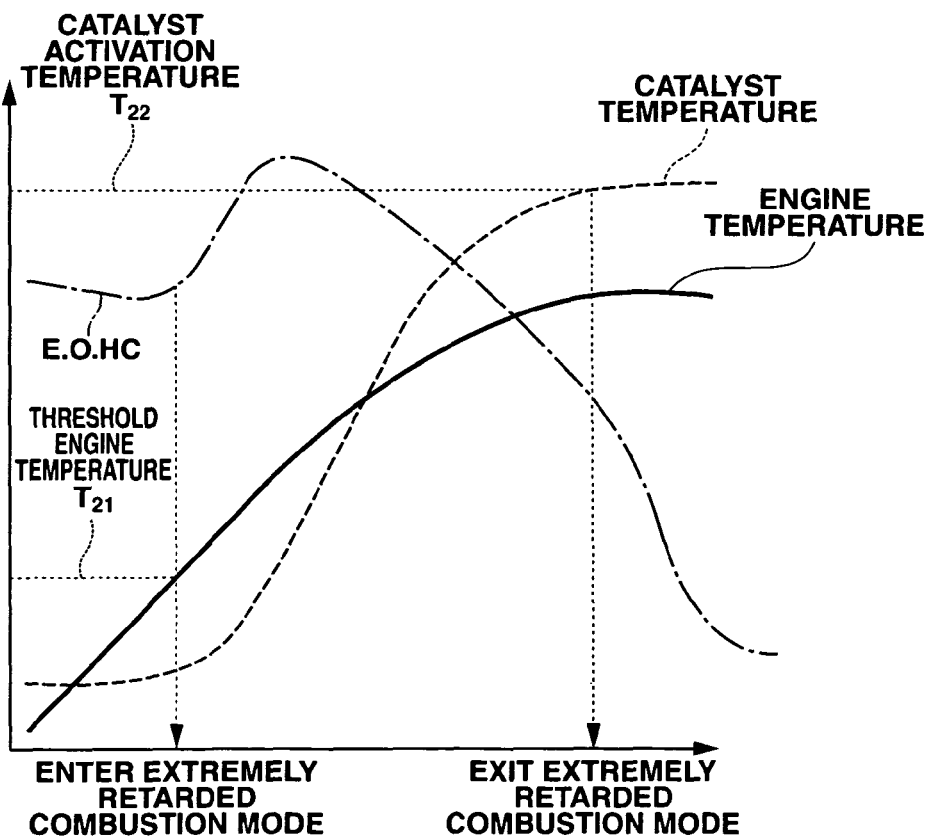

COMBUSTION CONTROL APPARATUS FOR DIRECT-INJECTION SPARK-IGNITION INTERNAL COMBUSTION ENGINE

BACKGROUND OF THE INVENTION

The present invention relates generally to direct-injection spark-ignition internal combustion engines, and more particularly to combustion control for direct-injection spark-ignition internal combustion engines in the presence of a request for rapid temperature rise of an exhaust purifier of the engine.

Japanese Patent No. 3325230 shows a technique for warming up an exhaust purifier of a direct-injection spark-ignition internal combustion engine when the exhaust purifier is not fully warmed up to its activation temperature. This technique employs split fuel injection during a period from intake stroke to ignition timing. The split fuel injection includes at least two fuel injection steps, i.e. a later fuel injection step carried out in the middle or later stage of compression stroke, e.g., from 120° BTDC to 45° BTDC (phase in crank angle before top dead center), to form an air-fuel mixture having local unevenness in air-fuel ratio in a combustion chamber, and an earlier fuel injection step carried out prior to the later fuel injection step to form an air-fuel mixture leaner than stoichiometric so that ignition of the later charge may initiate complete combustion of the earlier charge by flame propagation. During the split fuel injection, the ignition timing is retarded by a predetermined amount from an MBT (minimum advance for best torque) point. On the other hand, in a no-load engine operation region, the ignition timing is set to be before compression top dead center (TDC). In a low-speed and low-load engine operation region other than the no-load engine operation region, the ignition timing is retarded to be after compression TDC.

SUMMARY OF THE INVENTION

Retardation of ignition timing of an internal combustion engine is effective for rapid thermal activation of an exhaust purifier and reduction of HC (hydrocarbon) emissions due to afterburning when the engine is in a cold state. It is more preferred that the ignition timing is after compression TDC (henceforth referred to as "ATDC ignition"). For stabilizing such combustion based on ATDC ignition, it is effective to enhance turbulence in incylinder flow so that the combustion speed (flame propagation speed) rises and thereby the combustion period decreases.

In the above-mentioned technique of Japanese Patent No. 3325230, however, the later fuel injection step is carried out at a timing from 120° BTDC to 45° BTDC before compression TDC. The incylinder turbulence, even though enhanced by such BTDC fuel injection, diminishes after compression TDC so as not to serve for increasing the flame propagation speed in combustion based on ATDC ignition.

FIG. 24 is a graph showing changes in the incylinder turbulence of an internal combustion engine equipped with a gas flow control valve such as a tumble control valve in an intake port. In FIG. 24, solid lines represents a case in which the gas flow control valve is operative, while broken lines represents a case in which the gas flow control valve is inoperative. Upon operation of the gas flow control valve, the incylinder turbulence is enhanced during intake stroke as shown in a region indicated by "A" in FIG. 24, and diminishes over the course of compression stroke. The incylinder turbulence is temporarily enhanced due to decay of the tumble flow in the late stage of compression stroke as shown in a region indicated by "B" in FIG. 24, but is rapidly weakened after compression TDC as shown in a region indicated by "C" in FIG. 24. It is also unlikely that such gas flow control valve serves to improvement in the flame propagation speed.

In view of the above, in Japanese Patent No. 3325230, the ignition timing is set to be before compression TDC (BTDC ignition) in the no-load engine operation region in order to ensure combustion stability, although ATDC ignition is more advantageous for raising exhaust gas temperature and reducing HC emissions.

Accordingly, it is an object of the present invention to improve combustion stability of an internal combustion engine, even when ignition timing is retarded to be after compression TDC, so as to allow rapid catalyst activation and reduction of HC emissions.

According to one aspect of the present invention, a combustion control apparatus for an internal combustion engine, comprises: a fuel injector configured to inject fuel into a combustion chamber of the internal combustion engine at a fuel injection timing; a spark plug configured to produce a spark in the combustion chamber at an ignition timing; and a control unit connected to the fuel injector and the spark plug and configured to perform the following in an extremely retarded combustion mode while the internal combustion engine is in a predetermined operating state: setting the ignition timing to be after compression top dead center; and setting the fuel injection timing to be before the ignition timing and after compression top dead center, the control unit being configured to inhibit the extremely retarded combustion mode while an exhaust purifier of the internal combustion engine is in a predetermined cold state.

According to another aspect of the invention, a combustion control apparatus for an internal combustion engine, comprises: fuel injection means for injecting fuel into a combustion chamber of the internal combustion engine at a fuel injection timing; spark means for producing a spark in the combustion chamber at an ignition timing; and control means for performing the following in an extremely retarded combustion mode while the internal combustion engine is in a predetermined operating state: setting the ignition timing to be after compression top dead center; and setting the fuel injection timing to be before the ignition timing and after compression top dead center, and the control means being configured to inhibit the extremely retarded combustion mode while an exhaust purifier of the internal combustion engine is in a predetermined cold state.

According to a further aspect of the invention, a method of controlling an internal combustion engine including a fuel injector configured to inject fuel into a combustion chamber of the internal combustion engine at a fuel injection timing, and a spark plug configured to produce a spark in the combustion chamber at an ignition timing, comprises: performing the following in an extremely retarded combustion mode while the internal combustion engine is in a predetermined operating state: setting the ignition timing to be after compression top dead center; and setting the fuel injection timing to be before the ignition timing and after compression top dead center; and inhibiting the extremely retarded combustion mode while an exhaust purifier of the internal combustion engine is in a predetermined cold state.

BRIEF DESCRIPTION OF THE DRAWINGS

FIGS. 20A and 20B are graphs showing an air-fuel ratio measured by an upstream air-fuel ratio sensor, and an air-fuel ratio measured by a downstream air-fuel ratio sensor, respectively.

FIG. 21 is a graph showing changes in an engine temperature, a catalyst temperature, and a quantity of engine-out HC emissions in cold start in accordance with a seventh embodiment.

DETAILED DESCRIPTION OF THE INVENTION

Figure 1:
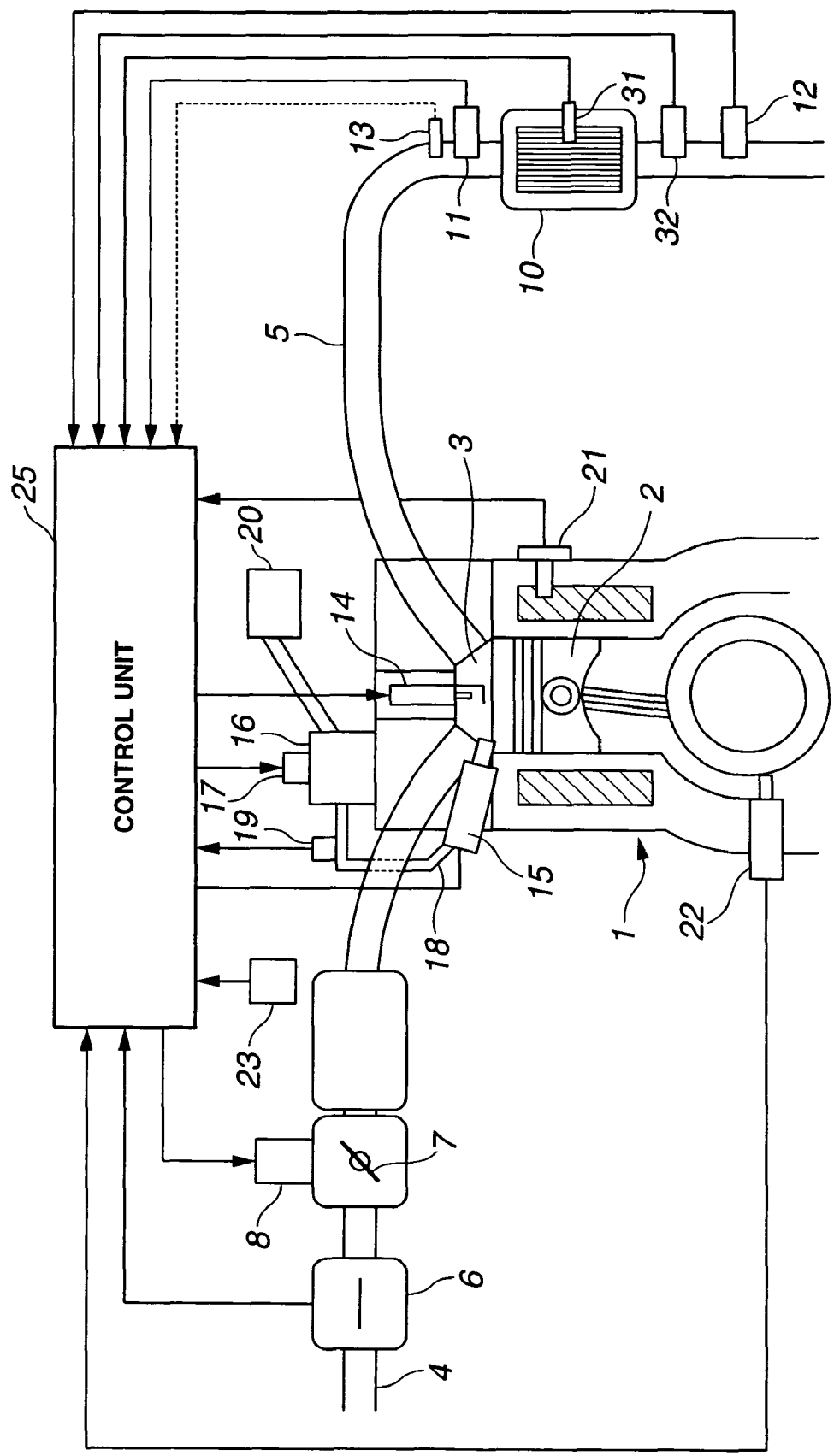
FIG. 1 is a schematic block diagram showing system configuration of an internal combustion engine with a combustion control apparatus in accordance with accompanying embodiments.

FIG. 1 is a schematic block diagram showing system configuration of an internal combustion engine with a combustion control apparatus in accordance with accompanying embodiments. As shown in FIG. 1, in an internal combustion engine 1, each piston 2 defines a combustion chamber 3, which is connected to an intake air passage 4 via each intake valve not shown, and is connected to an exhaust gas passage 5 via each exhaust valve not shown. In intake air passage 4 are arranged an air flow meter 6 adapted to measure the amount of intake air, and an electronically controlled throttle valve 7 whose opening is controlled by an actuator 8 in accordance with a control signal from a below-mentioned control unit 25. In exhaust gas passage 5 is arranged an exhaust purifier 10 such as a catalytic converter having a monolith ceramic catalyst carrier for purifying the exhaust gas. In upstream and downstream positions are arranged air-fuel ratio sensors 11 and 12, respectively. Near upstream air-fuel ratio sensor 11 is arranged an exhaust gas temperature sensor 13 adapted to measure the temperature of the exhaust gas at an inlet point of catalytic converter 10. A catalyst temperature sensor 31 is disposed in a longitudinally central position of the catalyst carrier of catalytic converter 10, while a catalytic converter outlet temperature sensor 32 is disposed in an outlet position of catalytic converter 10. These sensors 31 and 32 serve for measuring a thermal state of catalytic converter 10.

As shown in FIG. 1, a spark plug 14 is disposed in a central apex portion of the roof of combustion chamber 3 to produce a spark within combustion chamber 3. A fuel injection valve 15 as a fuel injector is disposed in a portion of the side wall of combustion chamber 3 nearer to intake air passage 4, and adapted to inject or spray fuel directly into combustion chamber 3. Fuel is regulated to a predetermined pressure by a high pressure fuel pump 16 and a pressure regulator 17, and then supplied to fuel injection valve 15 via a high pressure fuel passage 18. Receiving a control pulse signal, fuel injection valve 15 opens to spray the fuel into combustion chamber 3. The fuel injection quantity is adjusted in accordance with the period in which fuel injection valve 15 is in an open state. A fuel pressure sensor 19 is disposed in high pressure fuel passage 18. A low pressure fuel pump 20 feeds fuel to high pressure fuel pump 16.

As shown in FIG. 1, in internal combustion engine 1 are provided other sensors. Coolant temperature sensor 21 is adapted to measure the temperature of an engine coolant. Crank angle sensor 22 is adapted to measure the crank angle. Accelerator opening sensor 23 is adapted to measure the depression of an accelerator pedal.

An electrical control unit 25 is configured to control the quantity and timing of fuel injection, the ignition timing, of internal combustion engine 1. In general, the fuel injection timing may be represented by a fuel injection start timing, and the fuel injection quantity may be changed in accordance with the period of fuel injection. Specifically, as shown in FIG. 1, control unit 25 is configured to receive sensing signals from the above-mentioned sensors. In accordance with engine operating conditions determined in accordance with the input signals, control unit 25 selects one of a homogeneous charge combustion mode and a stratified charge combustion mode, and accordingly controls the opening of electronically controlled throttle valve 7, the quantity and timing of fuel injection of fuel injection valve 15, the ignition timing of spark plug 14, etc. While internal combustion engine 1 is in a predetermined region of low-speed and low-load after warming-up, control unit 25 selects a normal stratified charge combustion mode to control the fuel injection timing at a proper timing during compression stroke, and to control the ignition timing to be before compression TDC. In the normal stratified charge combustion mode, a layer of fuel spray is formed intensively around spark plug 14 and thereby internal combustion engine 1 performs extremely lean stratified charge combustion with an overall air-fuel ratio of about from 30 to 40. While internal combustion engine 1 is in a predetermined region of high-speed and high-load after warming-up, control unit 25 selects a normal homogeneous charge combustion mode to control the fuel injection timing to be in intake stroke, and to control the ignition timing at or near the MBT point before compression TDC. In the homogeneous charge combustion mode, the air-fuel mixture is homogeneous in combustion chamber 3. The homogeneous charge combustion mode specifically has a homogeneous stoichiometric combustion mode with a stoichiometric air-fuel ratio, and a homogeneous lean combustion mode with a lean air-fuel ratio of about from 20 to 30.

Control unit 25 also controls internal combustion engine 1 in a special combustion mode referred to as an extremely retarded combustion mode to retard the combustion so as to raise the exhaust gas temperature quickly when engine 1 is in a cold start state where a request to rapidly raise the temperature of catalytic converter 10 or to rapidly raise the exhaust gas temperature is active. The following describes the fuel injection timing and the ignition timing of this extremely retarded combustion mode, with reference to FIGS. 2A through 2C.

Figure 2:
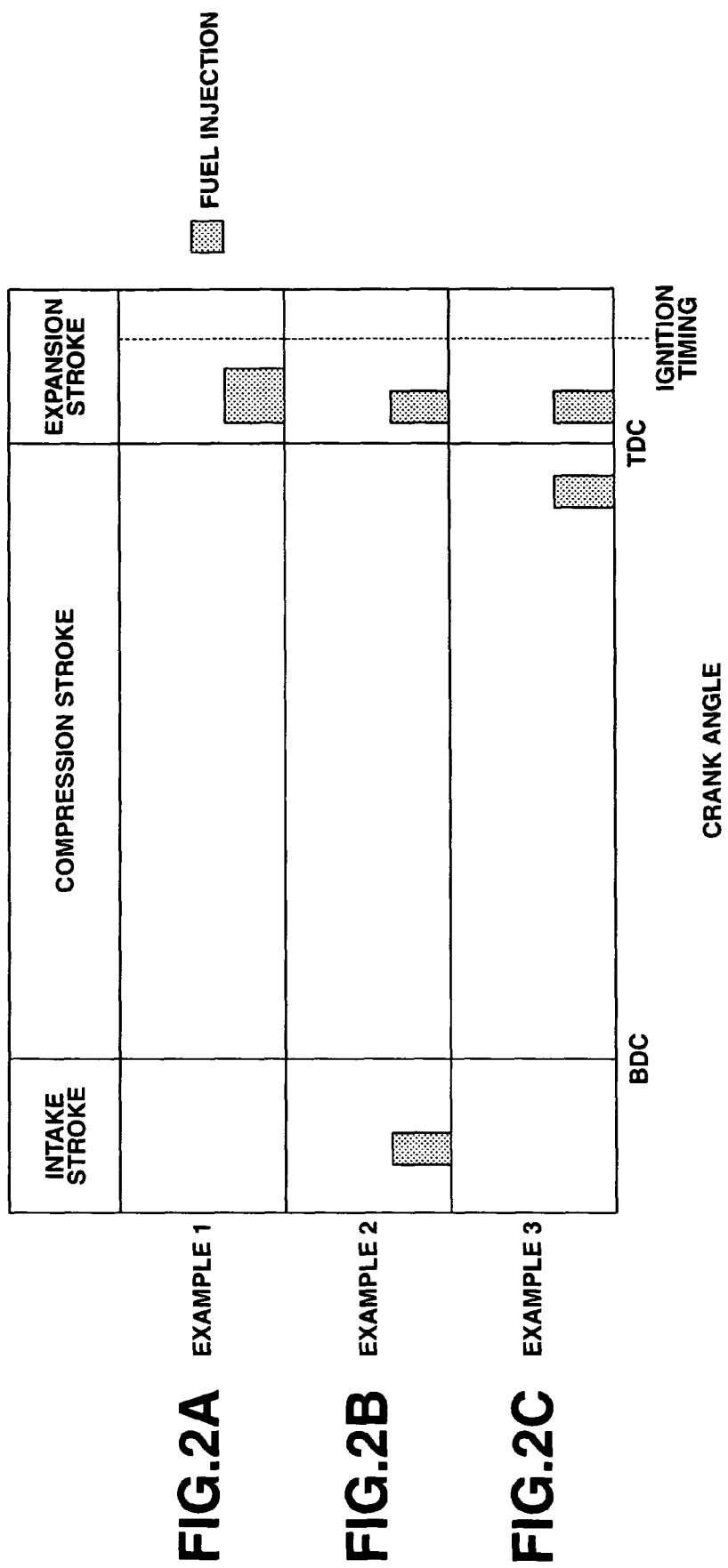
FIGS. 2A, 2B, and 2C are characteristic diagrams showing three examples of fuel injection timing and ignition timing in an extremely retarded combustion mode in the accompanying embodiments.

FIGS. 2A, 2B, and 2C are characteristic diagrams showing three examples of the fuel injection timing and the ignition timing of the extremely retarded combustion mode. In the first example as shown in FIG. 2A, the ignition timing is set within a range of 15° ATDC to 30° ATDC, e.g., at 20° ATDC (phase in crank angle after top dead center) during expansion stroke, while the fuel injection timing or specifically fuel injection start timing is set to be after compression TDC and before the ignition timing. Upon this, the air-fuel ratio is set to be stoichiometric or slightly leaner, such as a value of about 16 to 17. In general, it is preferred to retard the ignition timing, specifically to retard the ignition timing to be after compression TDC (ATDC ignition), for promoting catalyst activation and reducing engine out HC emissions. The combustion based on ATDC ignition may be stabilized by reducing the period of the combustion. The incylinder turbulence serves for promoting flame propagation to enhance the combustion speed. Although the incylinder turbulence, even though enhanced during intake stroke or compression stroke, diminishes after compression TDC as mentioned above, high pressure fuel injection in expansion stroke after compression TDC is effective for generating and enhancing the incylinder turbulence in the first example of the extremely retarded combustion. This promotes the flame propagation and enhances the combustion stability in the combustion based on ATDC ignition.

In the second example as shown in FIG. 2B, fuel is injected twice in split timings, in which the first fuel injection timing is in intake stroke and the second fuel injection timing is after compression TDC and before the ignition timing. The ignition timing and air-fuel ratio in consideration of two fuel injection steps are the same as in the first example. In the second example, the first fuel injection prior to the second fuel injection is effective little for enhancing the incylinder turbulence since the incylinder turbulence diminishes during the late stage of compression stroke, but effective for reducing engine out HC emissions and raising the exhaust gas temperature since the injected fuel is dispersed enough within the combustion chamber to promote afterburning of HC emissions due to the ATDC ignition.

In the third example as shown in FIG. 2C, fuel is injected twice in split timings, in which the first fuel injection timing is in compression stroke and the second fuel injection timing is after compression TDC. The ignition timing and air-fuel ratio in consideration of two fuel injection steps are the same as in the first example. In the third example, the incylinder turbulence generated by the first fuel injection prior to the second fuel injection diminishes more slowly than in the second example so that the second injection is carried out in the presence of the incylinder turbulence to enhance the incylinder gas flow and turbulence at or near compression TDC.

Although the first fuel injection of the third example may be in the first half of compression stroke, it is preferred to set the first fuel injection timing to be in the second half of compression stroke, i.e. at or after 90° BTDC so that the incylinder turbulence is more effectively enhanced near compression TDC. Particularly, the first fuel injection timing is preferably after 45° BTDC, more preferably after 20° BTDC, for enhancing the incylinder gas flow after compression TDC.

In the above three examples of the extremely retarded combustion, the fuel injection generates and enhances the incylinder turbulence immediately before ignition, and thereby promotes the flame propagation and stabilizes the combustion. In particular, the late ignition timing of from 15 to 30° ATDC is effective for rapid catalyst activation and afterburning to reduce the engine out HC emissions. Thus, with a significantly retarded ignition timing, fuel injection timing retarded to be immediately before the ignition timing is effective for retarding the timing of occurrence and development of the incylinder turbulence, and improving the combustion in flame propagation.

As discussed above, the extremely retarded combustion mode serves for raising the exhaust gas temperature very high and thereby rapidly warming up catalytic converter 10. However, in case the extremely retarded combustion mode is employed from engine start when catalytic converter 10 is in a completely cold state such as a state where the temperature is near an outside air temperature, it is possible that catalytic converter 10 is subjected upon a large spatial thermal gradient. Specifically it is possible that an upstream portion of the monolith ceramic catalyst carrier of catalytic converter 10 is locally and rapidly heated to cause thermal strain in catalytic converter 10. In the present embodiments, control unit 25 operates internal combustion engine 1 in a plurality of combustion modes, which are switched in accordance with a thermal state of catalytic converter 10.

Figure 3:
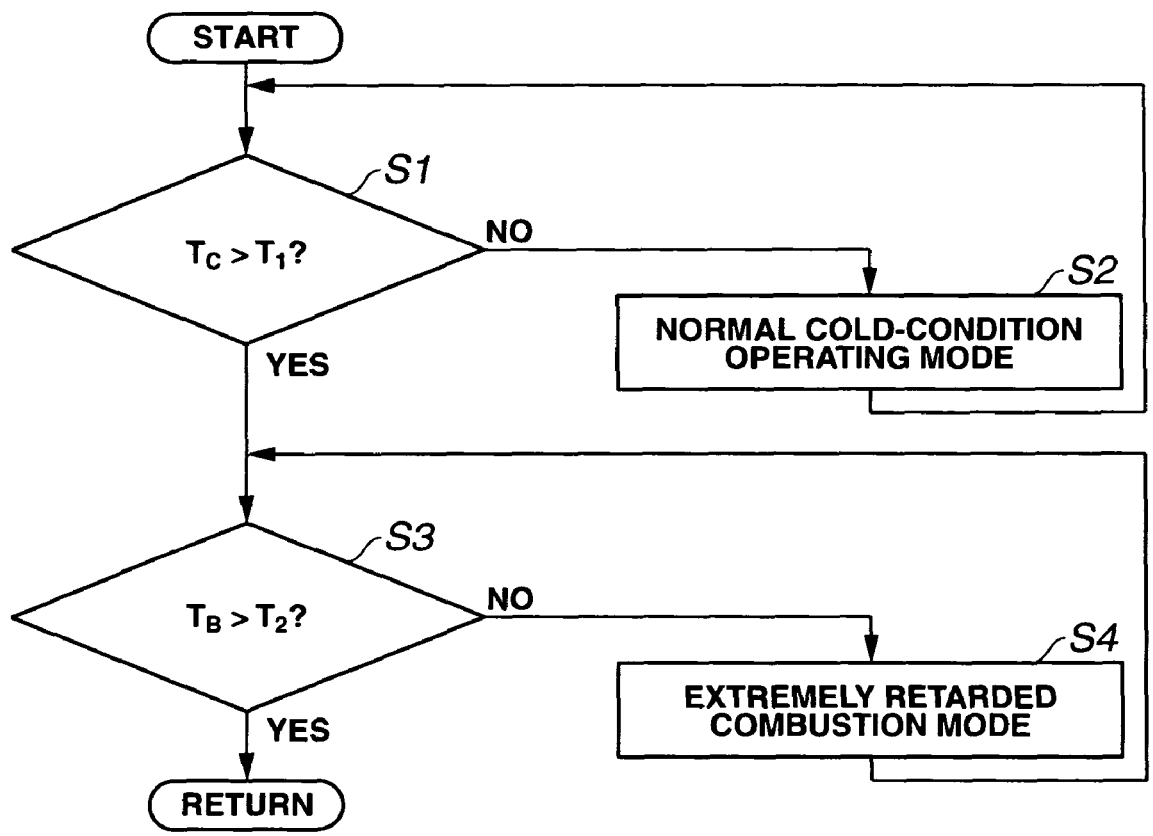
FIG. 3 is a flow chart showing a process of combustion mode shift for engine start in accordance with a first embodiment.

FIG. 3 is a flow chart showing a process of combustion mode shift for engine start to be performed by control unit 25.

Control unit 25 repeatedly executes the routine of FIG. 3 at intervals of a predetermined processing time interval. As shown in FIG. 3, first, at step S1, control unit 25 compares a predetermined first reference temperature $T_1$ with a catalytic converter outlet temperature $T_C$ as defined as the temperature of an inlet point of catalytic converter 10 measured by catalytic converter outlet temperature sensor 32. Specifically, control unit 25 determines whether or not catalytic converter outlet temperature $T_C$ is higher than first reference temperature $T_1$. First reference temperature $T_1$ is substantially identical to the lowest activation temperature of the associated catalyst, such as a temperature of from 150° C. to 200° C. When the answer to step S1 is negative (NO), the routine proceeds to step S2. At step S2, control unit 25 operates the engine in a normal cold condition operating mode. In the normal cold condition operating mode, the engine is controlled to moderately increase the exhaust gas temperature. The temperature increase is not so rapid as in the extremely retarded combustion mode. Specifically, in the normal cold condition operating mode, the fuel injection timing is set to be in intake stroke, and the ignition timing is set to be a little before the MBT point before compression TDC. Fuel injection may be performed during compression stroke in addition to the intake stroke fuel injection. Thus, when catalytic converter 10 is in a completely cold state in engine start, control unit 25 operates the engine in the normal cold condition operating mode so that the temperature of catalytic converter 10 gradually increases.

On the other hand, when the answer to step S1 is affirmative (YES), the routine proceeds to step S3. At step S3, control unit 25 compares a predetermined second reference temperature $T_2$ with a catalyst temperature $T_B$ as defined as the temperature of a portion of the catalyst carrier of catalytic converter 10 measured by catalyst temperature sensor 31. Specifically, control unit 25 determines whether or not catalyst temperature $T_B$ is higher than second reference temperature $T_2$. Second reference temperature $T_2$ is substantially identical to a catalyst full activation temperature for full activity of the catalyst, particularly a little lower than the catalyst full activation temperature, such as a temperature of from 250° C. to 300° C. When the answer to step S3 is NO, the routine proceeds to step S4. On the other hand, when the answer to step S3 is YES, the routine returns. At step S4, control unit 25 operates the engine in the extremely retarded combustion mode. In cold start, at the moment when catalytic converter outlet temperature $T_C$ exceeds first reference temperature $T_1$, catalyst temperature $T_B$ is usually lower than second reference temperature $T_2$. Accordingly, during cold start, the engine operating mode is shifted from the normal cold condition operating mode to the extremely retarded combustion mode. In extremely retarded combustion mode, the exhaust gas temperature rapidly rises to rapidly warm up catalytic converter 10. The extremely retarded combustion mode continues until catalyst temperature $T_B$ exceeds second reference temperature $T_2$. When catalyst temperature $T_B$ exceeds second reference temperature $T_2$, control unit 25 exits the process for the period when the engine is in a cold state, and enters a normal warmed-up condition operating mode. Specifically, in the normal warmed-up condition operating mode, the engine is operated in the homogeneous charge combustion mode, or in the normal stratified charge combustion mode.

In accordance with the above-mentioned process, the extremely retarded combustion mode is inhibited until catalytic converter outlet temperature $T_C$ exceeds first reference temperature $T_1$. This is effective for avoiding is thermal degradation of catalytic converter 10 while reducing the period of catalyst full activation in the extremely retarded combustion mode.

Figure 4:
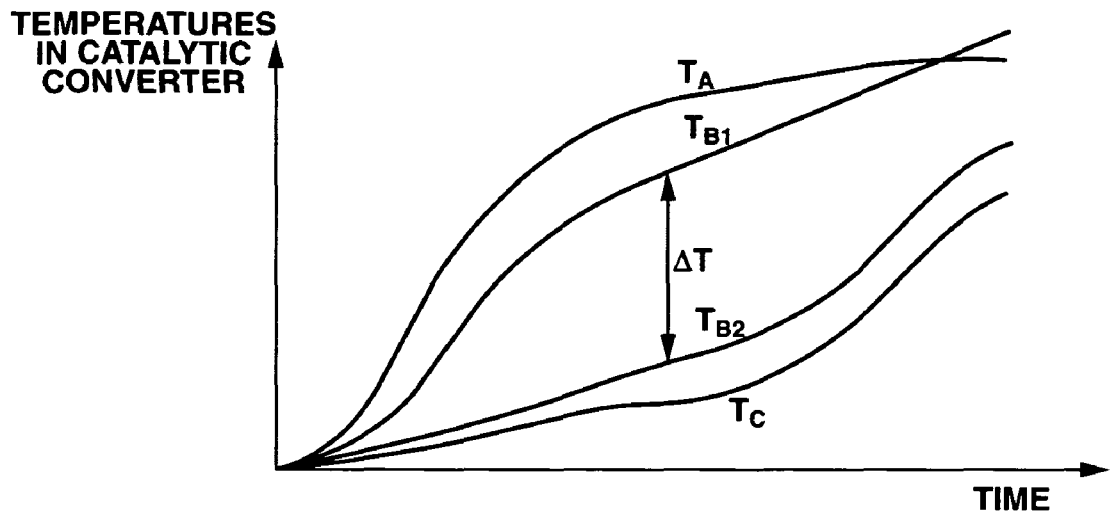
FIG. 4 is a graph showing changes in temperature of each reference point of a catalytic converter when the catalytic converter is subjected under a high exhaust gas temperature in the first embodiment.
Figure 5:
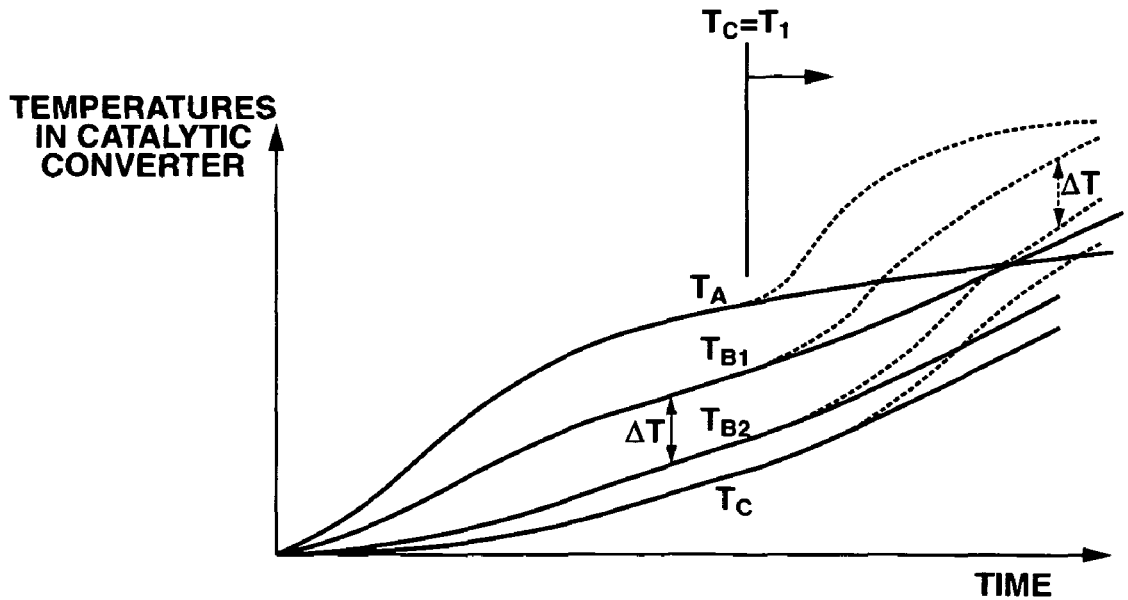
FIG. 5 is a graph showing changes in temperature of each reference point of the catalytic converter when the catalytic converter is subjected under a low exhaust gas temperature in the first embodiment.
Figure 6:
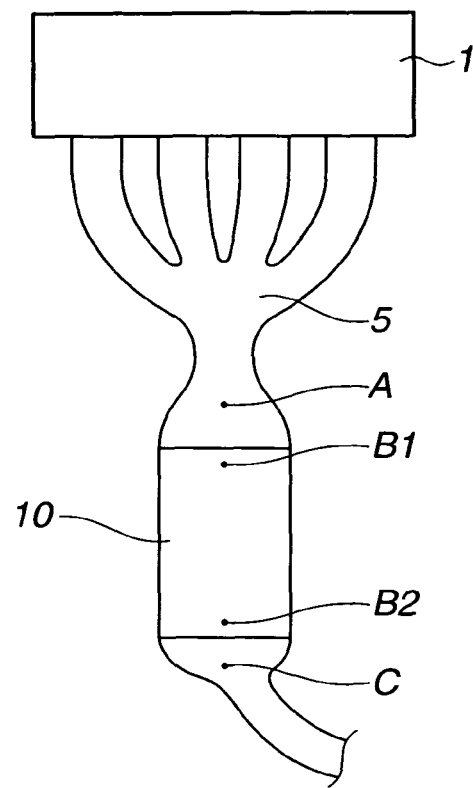
FIG. 6 is a schematic plan view of an exhaust system of the engine, showing the position of each reference point whose temperature is measured as in the graphs of FIGS. 4 and 5.

FIGS. 4 and 5 are graphs showing changes in temperature of each reference point of catalytic converter 10. FIG. 4 shows a case where catalytic converter 10 is subjected under a very high exhaust gas temperature. FIG. 5 shows a case where catalytic converter 10 is subjected under a relatively low exhaust gas temperature. FIG. 6 is a schematic plan view of an exhaust system of the engine, showing the position of each reference point whose temperature is measured as in the graphs of FIGS. 4 and 5. The sensors measure a temperature $T_A$ at an inlet point A of catalytic converter 10, a temperature $T_{B1}$ at an upstream point B1 of the catalyst carrier, a temperature $T_{B2}$ at a downstream point B2 of the catalyst carrier, and temperature $T_C$ at an outlet point of catalytic converter 10.

As shown in FIG. 4, in case the engine has been operated in the extremely retarded combustion mode to hold the exhaust gas temperature high since engine start, temperature $T_{B1}$ and temperature $T_A$ increase rapidly so that the difference $\Delta T$ between temperatures $T_{B1}$ and $T_{B2}$ is very large. This causes a large amount of thermal distortion in catalytic converter 10.

In contrast, in case the exhaust gas temperature is relatively low, the temperature difference $\Delta T$ is small enough, as shown in FIG. 5. When the extremely retarded combustion mode is started at a time point temperature $T_C$ exceeds first reference temperature $T_1$, the temperatures change as shown by broken lines in FIG. 5. After the start of the extremely retarded combustion mode, the temperatures increase rapidly so that the time required to completely activate the catalyst is comparable with the required time of the case of FIG. 4. At the time point of the mode switch, there is released heat of reaction in the catalyst. This keeps the temperature difference $\Delta T$ relatively small.

Figure 7:
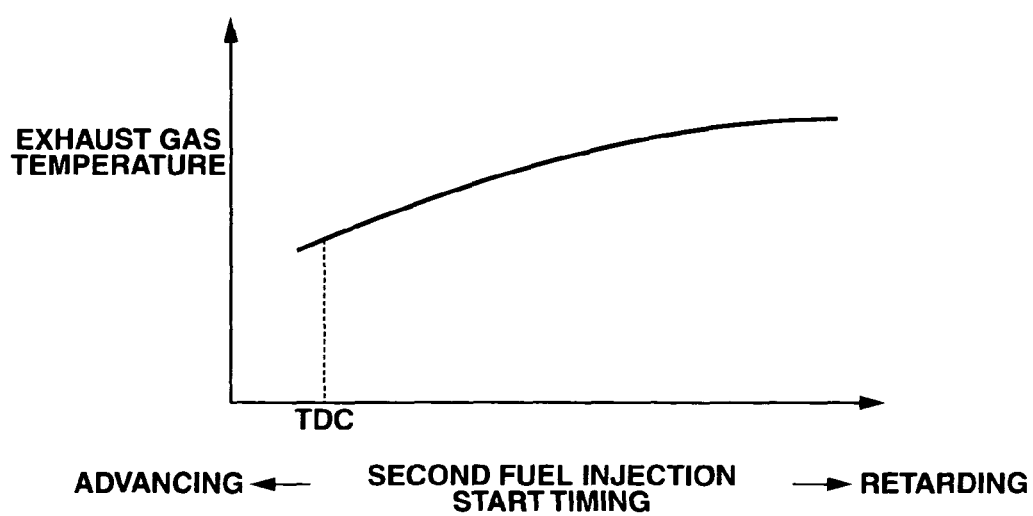
FIG. 7 is a graph showing relationship between fuel injection timing and exhaust gas temperature in the first embodiment.

In the extremely retarded combustion mode, the fuel injection timing may be controlled in such a manner that the exhaust gas temperature gradually rises. Specifically, control unit 25 may be configured to perform the following in the extremely retarded combustion mode: controlling fuel injection valve 15 to inject fuel at a prior fuel injection timing during intake and compression strokes and at a second fuel injection timing; and retarding the second fuel injection timing gradually to a predetermined timing point in an initial stage of the extremely retarded combustion mode. For example, in case the fuel is injected in split timings as in the above-discussed second and third examples, the exhaust gas temperature varies in accordance with the second fuel injection timing as shown in FIG. 7. In particular, as shown in FIG. 7, the exhaust gas temperature increases as the second fuel injection timing is retarded. The second fuel injection timing may be controlled in such a manner to be advanced near TDC just after shift into the extremely retarded combustion mode, and then to be retarded gradually toward a predetermined timing. This may raise the exhaust gas temperature gradually, which is effective for reducing the thermal distortion of the catalyst carrier more reliably. Herein, the second fuel injection timing may be temporarily before compression TDC. For example, the period of fuel injection may straddle compression TDC.

As mentioned above, in case the extremely retarded combustion mode is employed from engine start when catalytic converter 10 is in a completely cold state, it is possible that catalytic converter 10 has a large amount of thermal strain. However, in this embodiment, the engine is operated in a plurality of combustion modes, which are switched in accordance with the thermal state of catalytic converter 10. Specifically, the extremely retarded combustion mode is inhibited during catalytic converter 10 being in a predetermined low thermal state. More specifically, the extremely retarded combustion mode is inhibited until catalytic converter outlet temperature $T_C$ exceeds first reference temperature $T_1$. Since the change in catalytic converter outlet temperature $T_C$ is generated with delay in response to the change in temperature of the catalyst carrier, the increase in catalytic converter outlet temperature $T_C$ may be considered as indicating that temperatures of catalytic converter 10 rises as a whole. Accordingly, the extremely retarded combustion mode, when employed to raise the exhaust gas temperature after catalytic converter outlet temperature $T_C$ exceeds first reference temperature $T_1$, does not cause an excessive amount of heat distortion.

Figure 8:
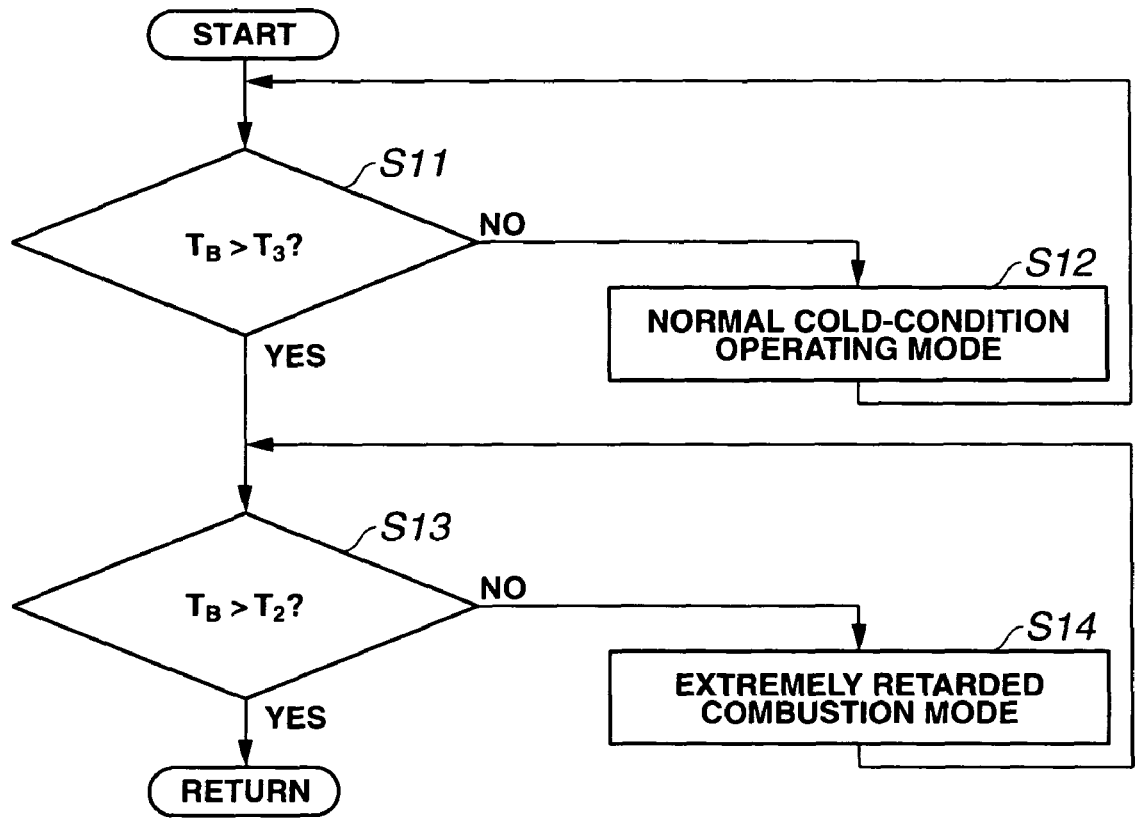
FIG. 8 is a flow chart showing a process of combustion mode shift for engine start in accordance with a second embodiment.

FIG. 8 is a flow chart showing a process of combustion mode shift for engine start in accordance with a second embodiment. As shown in FIG. 8, first, at step S11, control unit 25 compares a predetermined third reference temperature $T_3$ with catalyst temperature $T_B$ measured by catalyst temperature sensor 31. Specifically, control unit 25 determines whether or not catalyst temperature $T_B$ is higher than third reference temperature $T_3$. Third reference temperature $T_3$ is substantially identical to the lowest catalyst activation temperature, such as a temperature of from 150° C. to 200° C. When the answer to step S11 is NO, the routine proceeds to step S12. At step S12, control unit 25 operates the engine in the normal cold condition operating mode.

On the other hand, when the answer to step S11 is YES, the routine proceeds to step S13. At step S13, control unit 25 determines whether or not catalyst temperature $T_B$ is higher than second reference temperature $T_2$. When the answer to step S13 is YES, the routine returns. On the other hand, when the answer to step S13 is NO, the routine proceeds to step S14. At step S14, control unit 25 operates the engine in the extremely retarded combustion mode. When in cold start, catalyst temperature $T_B$ is generally lower than second reference temperature $T_2$ and the extremely retarded combustion mode is employed at step S14. This raises the exhaust gas temperature and thereby warms up catalytic converter 10. The extremely retarded combustion mode continues until catalyst temperature $T_B$ exceeds second reference temperature $T_2$. When catalyst temperature $T_B$ exceeds second reference temperature $T_2$, control unit 25 terminates the process for the period when the engine is in a cold state and operates the engine in the normal warmed-up condition operating mode, that is, in the homogeneous charge combustion mode, or in the normal stratified charge combustion mode.

In accordance with the above-mentioned process, the extremely retarded combustion mode is inhibited until catalyst temperature $T_B$ exceeds third reference temperature $T_3$. This is effective for avoiding thermal degradation of catalytic converter 10 while reducing the period of catalyst full activation in the extremely retarded combustion mode. In this embodiment, the combustion control apparatus may be constructed without catalytic converter outlet temperature sensor 32.

In this embodiment, the extremely retarded combustion mode is inhibited until catalyst temperature $T_B$ exceeds third reference temperature $T_3$. After catalyst temperature $T_B$ exceeds third reference temperature $T_3$, the catalyst activation is started. At this time, the internal temperature of the catalyst rises due to the released heat of reaction. Accordingly, even when the exhaust gas temperature rises very high, the spatial thermal gradient in catalytic converter 10 is not so large.

Figure 9:
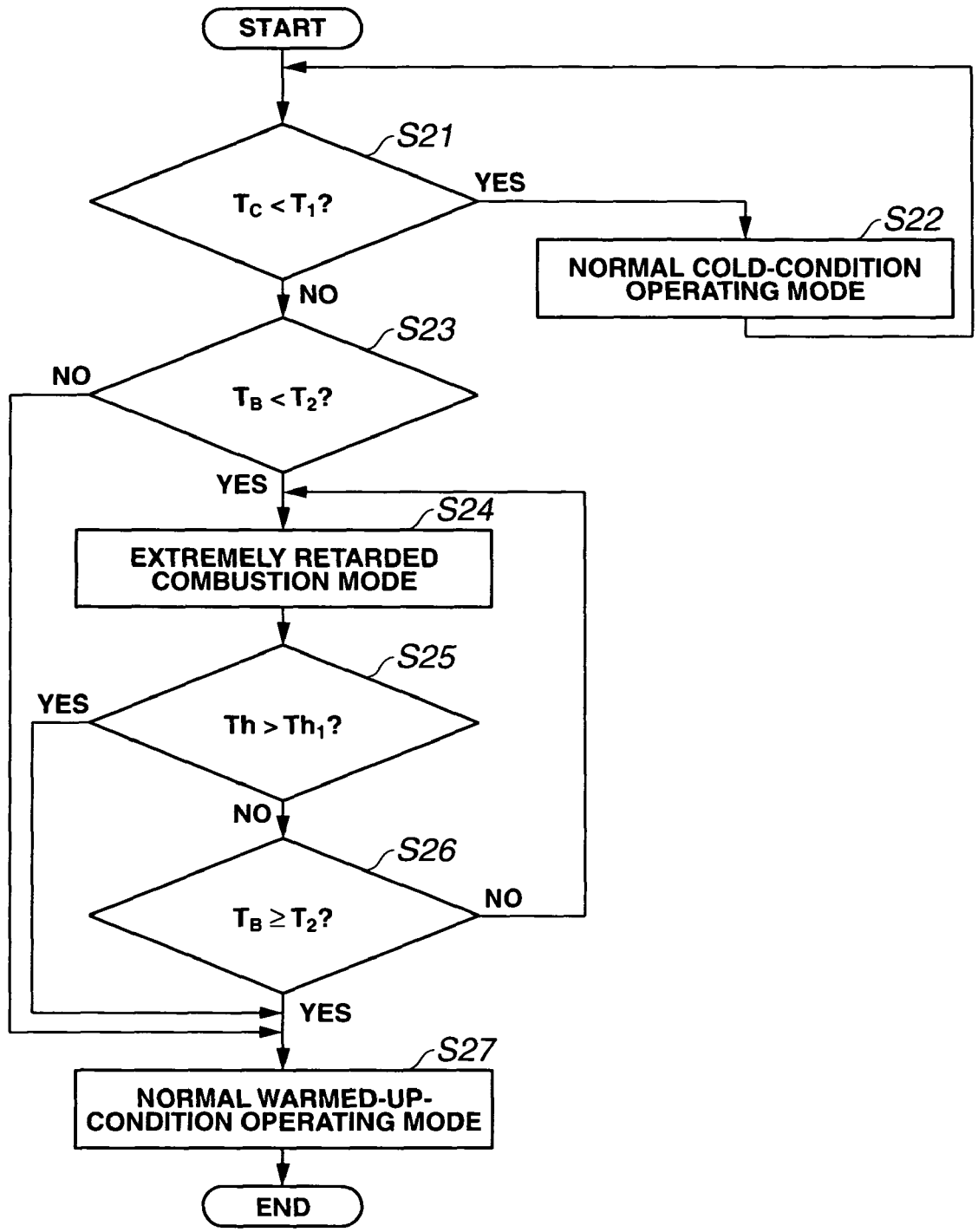
FIG. 9 is a flow chart showing a process of combustion mode shift for engine start in accordance with a third embodiment.

FIG. 9 is a flow chart showing a process of combustion mode shift for engine start in accordance with a third embodiment. As shown in FIG. 9, first, at step S21, control unit 25 compares first reference temperature $T_1$ with catalytic converter outlet temperature $T_C$ measured by catalytic converter outlet temperature sensor 32. Specifically, control unit 25 determines whether or not catalytic converter outlet temperature $T_C$ is lower than first reference temperature $T_1$. When the answer to step S21 is YES, the routine proceeds to step S22. At step S22, control unit 25 operates the engine in a normal cold condition operating mode. In the normal cold condition operating mode, the engine is controlled to moderately increase the exhaust gas temperature. The temperature increase is not so rapid as in the extremely retarded combustion mode. Specifically, in the normal cold condition operating mode, the fuel injection timing is set to be in intake stroke, and the ignition timing is set to be a little before the MBT point before compression TDC. Fuel injection may be performed during compression stroke in addition to the intake stroke fuel injection. Thus, when catalytic converter 10 is in a completely cold state in engine start, control unit 25 operates the engine in the normal cold condition operating mode so that the temperature of catalytic converter 10 gradually increases.

On the other hand, when the answer to step S21 is NO, the routine proceeds to step S23. At step S23, control unit 25 compares second reference temperature $T_2$ with catalyst temperature $T_B$ measured by catalyst temperature sensor 31. Specifically, control unit 25 determines whether or not catalyst temperature $T_B$ is lower than second reference temperature $T_2$. When the answer to step S23 is YES, the routine proceeds to step S24. On the other hand, when the answer to step S23 is NO, the routine proceeds to step S27. At step S24, control unit 25 operates the engine in the extremely retarded combustion mode. In cold start, at the moment catalytic converter outlet temperature $T_C$ exceeds first reference temperature $T_1$, catalyst temperature $T_B$ is usually lower than second reference temperature $T_2$. Accordingly, during cold start, the engine operating mode is shifted from the normal cold condition operating mode to the extremely retarded combustion mode. At step S26, control unit 25 determines whether or not catalyst temperature $T_B$ is higher than or equal to second reference temperature $T_2$. When the answer to step S26 is YES, the routine proceeds to step S27. On the other hand, when the answer to step S26 is NO, the routine proceeds back to step S24. Thus, the extremely retarded combustion mode is active until catalyst temperature $T_B$ exceeds second reference temperature $T_2$. At step S27, control unit 25 operates the engine in the normal warmed-up condition operating mode. Specifically, in the normal warmed-up condition operating mode, the engine is operated in the homogeneous charge combustion mode, or in the normal stratified charge combustion mode.

Between steps S24 and S26, step S25 is executed. At step S25, in the extremely retarded combustion mode, control unit 25 determines whether or not a throttle opening Th of electronically controlled throttle valve 7 is higher than a predetermined threshold value $Th_1$. When the answer to step S25 is YES, the routine proceeds to step S27. On the other hand, when the answer to step S25 is NO, the routine proceeds to step S26. Thus, control unit 25 exits the extremely retarded combustion mode, even when catalyst temperature $T_B$ does not exceed second reference temperature $T_2$, if throttle opening Th exceeds threshold value $Th_1$. In this embodiment, the extremely retarded combustion mode is shifted to the normal warmed-up condition operating mode. Alternatively, the normal cold condition operating mode may be employed until catalyst temperature $T_B$ exceeds second reference temperature $T_2$.

In accordance with the above-mentioned process, the extremely retarded combustion mode is inhibited until catalytic converter outlet temperature $T_C$ exceeds first reference temperature $T_1$. This is effective for avoiding thermal degradation of catalytic converter 10 while reducing the period of catalyst full activation in the extremely retarded combustion mode.

When throttle opening Th increases and thereby the fuel injection quantity increases in the extremely retarded combustion mode, it is possible that the exhaust gas temperature or catalytic converter inlet temperature $T_A$ rises to be excessively high to further increase temperature $T_{B1}$ and thereby to increase the temperature difference $\Delta T$ or the thermal strain in catalytic converter 10. Even after temperature $T_B$ reaches second reference temperature $T_2$ and thereby the extremely retarded combustion mode is terminated, it is possible that heat in the exhaust system in the upstream of catalytic converter 10 and heat of reaction in the catalyst serve to increase the internal temperature of catalytic converter 10 so that the internal temperature overshoots to degrade the catalyst. In contrast, in this embodiment, the control apparatus wherein the extremely retarded combustion mode discontinues when throttle opening Th exceeds threshold value $Th_1$, is effective for reducing the excessive temperature rise and the thermal strain.

When throttle opening Th decreases again to be lower than threshold value $Th_1$ after the extremely retarded combustion mode is inhibited because of throttle opening Th, the extremely retarded combustion mode is restarted if catalyst temperature $T_B$ is lower than second reference temperature $T_2$.

Figure 10:
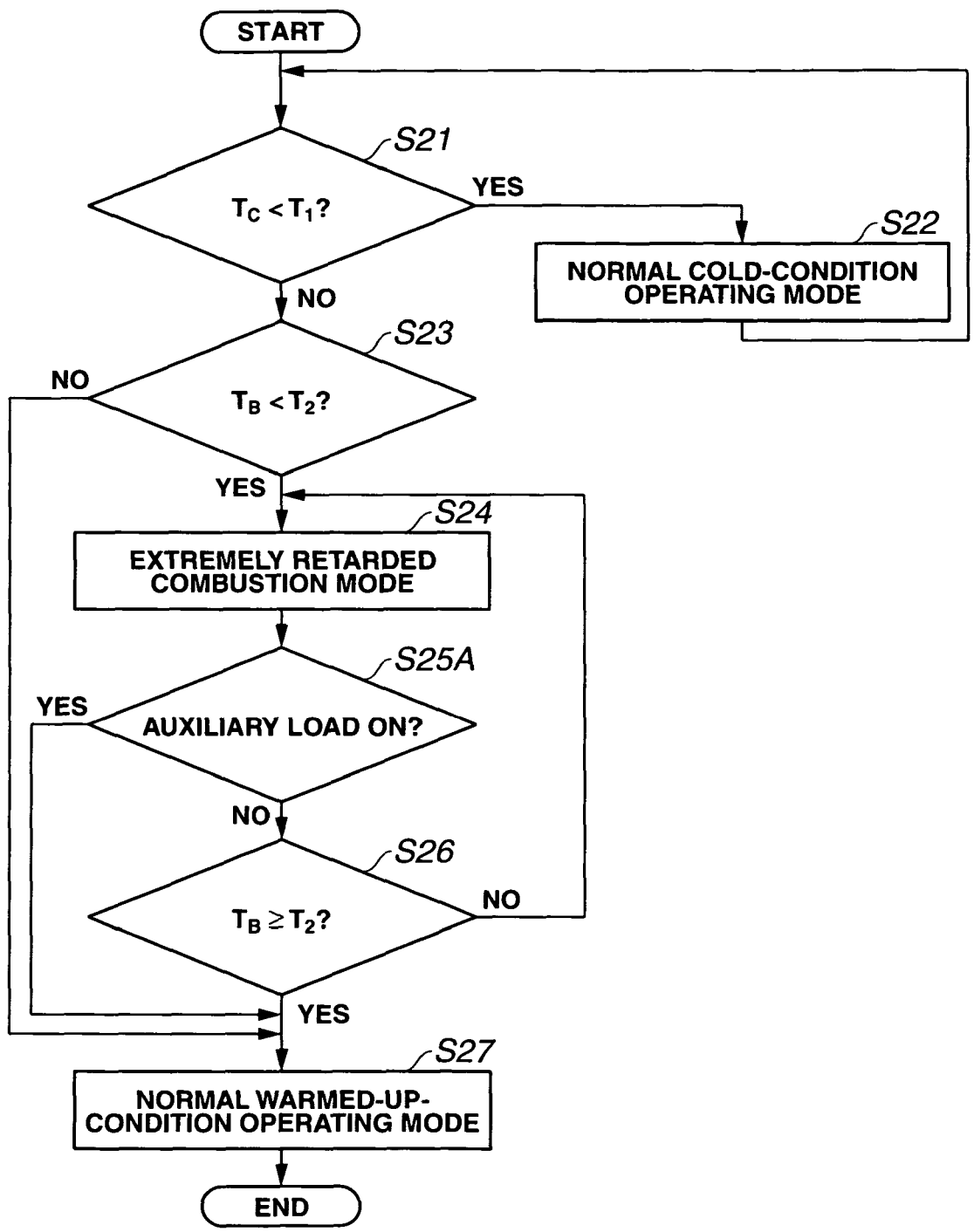
FIG. 10 is a flow chart showing a process of combustion mode shift for engine start in accordance with a first variation of the third embodiment in which a process of detecting changes in engine load is modified.
Figure 11:
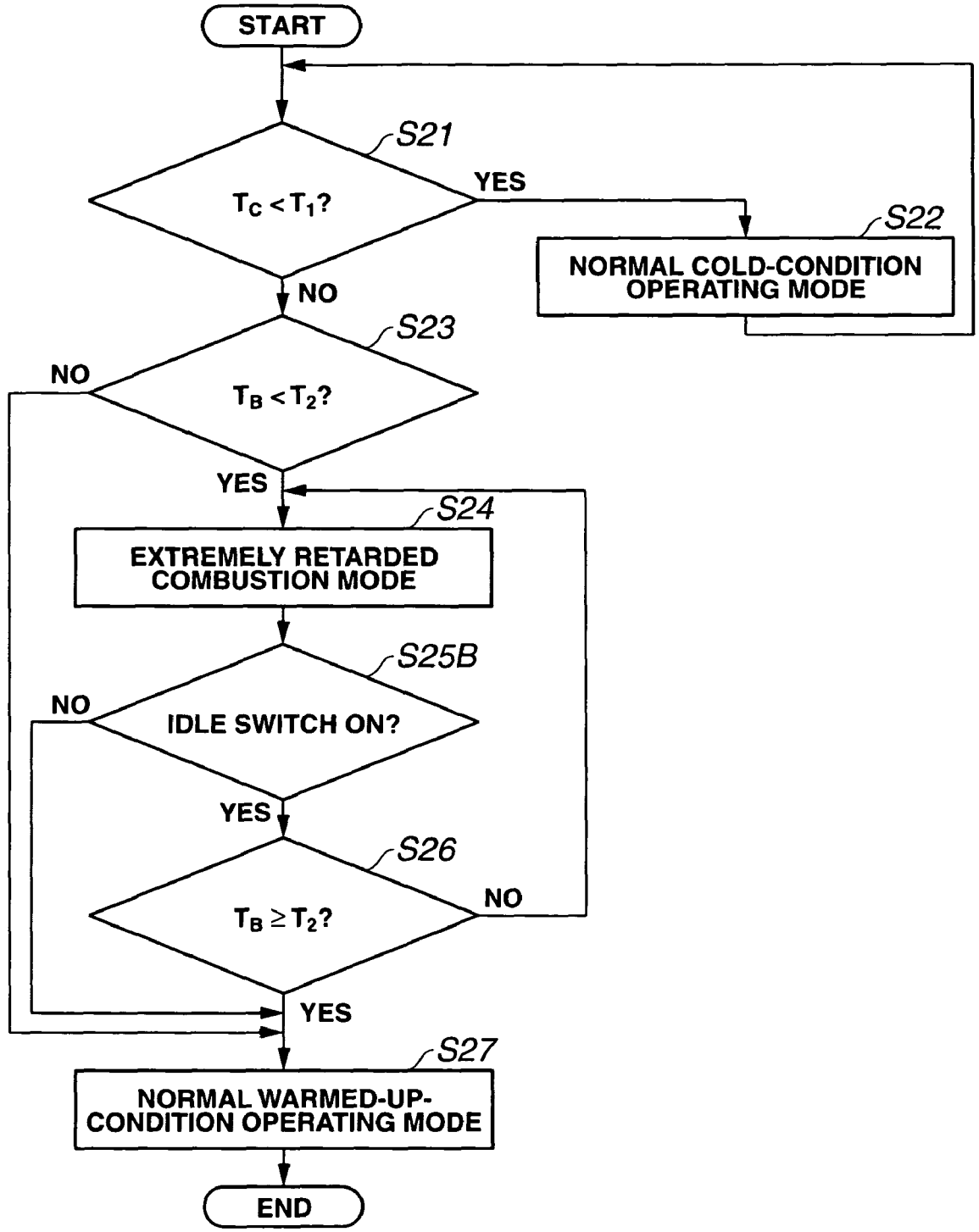
FIG. 11 is a flow chart showing a process of combustion mode shift for engine start in accordance with a second variation of the third embodiment in which the process of detecting changes in engine load is modified.

FIGS. 10 and 11 are flow charts showing modifications to the routine of FIG. 9. Step S25 in the routine of FIG. 9 is replaced with step S25A and S25B to provide the routine of FIGS. 10 and 11, respectively, in which whether the engine load is above a predetermined level is determined in accordance with engine operating conditions such as the operating state of auxiliary equipment and the operating state of an idle switch. As shown in FIG. 10, at step S25A, control unit 25 determines whether or not an auxiliary load is ON. The auxiliary load is a load of auxiliary equipment such as a compressor for air-conditioner. When the answer to step S25A is YES, the routine proceeds to step S27. On the other hand, when the answer to step S25A is NO, the routine proceeds to step S26. Thus, control unit 25 exits the extremely retarded combustion mode, even when catalyst temperature $T_B$ does not exceed second reference temperature $T_2$, if the auxiliary load is ON. Alternatively, control unit 25 may exit the extremely retarded combustion mode when the sum of loads of auxiliary devices exceeds a predetermined level.

As shown in FIG. 11, at step S25B, control unit 25 determines whether or not an idle switch is ON. When the answer to step S25B is YES, the routine proceeds to step S27. On the other hand, when the answer to step S25B is NO, the routine proceeds to step S26. Thus, control unit 25 exits the extremely retarded combustion mode, even when catalyst temperature $T_B$ does not exceed second reference temperature $T_2$, if the idle switch is ON. The ON signal of the idle switch indicates that the depression of the accelerator pedal or throttle opening Th of electronically controlled throttle valve 7 is zero. The idle switch signal may be produced in a non-physical process. For example, the idle switch signal may be generated by processing the sensing data from accelerator opening sensor 23. When internal combustion engine 1 shifts from an idling state into a non-idling state, e.g., when the vehicle starts from a standstill, the extremely retarded combustion mode is cancelled or inhibited.

Figure 12:
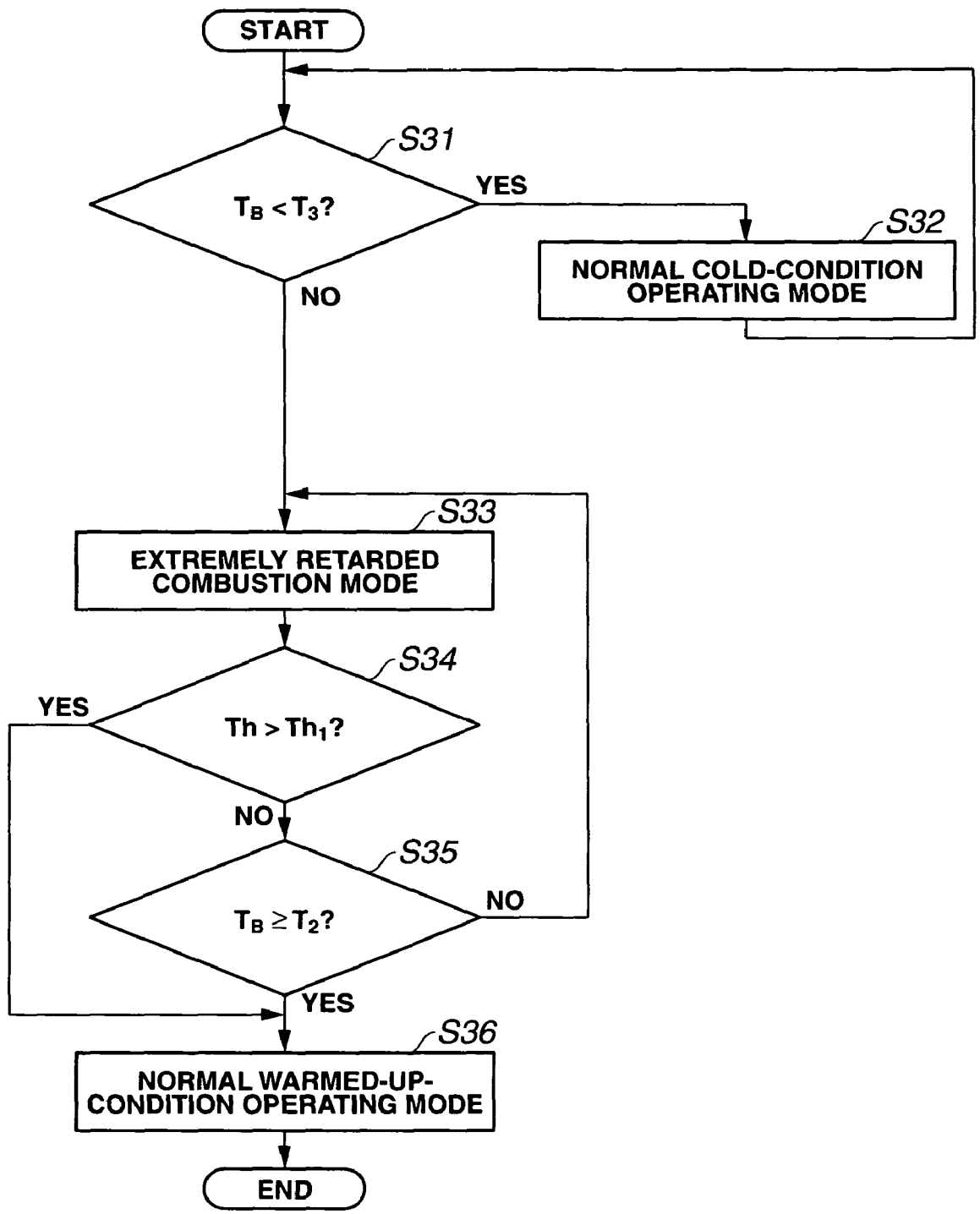
FIG. 12 is a flow chart showing a process of combustion mode shift for engine start in accordance with a fourth embodiment.

FIG. 12 is a flow chart showing a process of combustion mode shift for engine start in accordance with a fourth embodiment. As shown in FIG. 12, first, at step S31, control unit 25 compares a predetermined third reference temperature $T_3$ with catalyst temperature $T_B$ measured by catalyst temperature sensor 31. Specifically, control unit 25 determines whether or not catalyst temperature $T_B$ is lower than third reference temperature $T_3$. Third reference temperature $T_3$ is substantially identical to the lowest catalyst activation temperature, such as a temperature from 150° C. to 200° C. When the answer to step S31 is YES, the routine proceeds to step S32. At step S32, control unit 25 operates the engine in the normal cold condition operating mode.

On the other hand, when the answer to step S31 is NO, the routine proceeds to step S33. At step S33, control unit 25 operates the engine in the extremely retarded combustion mode. At step S35, control unit 25 determines whether or not catalyst temperature $T_B$ is higher than or equal to second reference temperature $T_2$. When the answer to step S35 is YES, the routine proceeds to step S36. On the other hand, when the answer to step S35 is NO, the routine proceeds back to step S33. Thus, the extremely retarded combustion mode is active until catalyst temperature $T_B$ exceeds second reference temperature $T_2$. At step S36, control unit 25 operates the engine in the normal warmed-up condition operating mode, that is, in the homogeneous charge combustion mode, or in the normal stratified charge combustion mode. Between steps S33 and S35, step S34 is executed. At step S34, in the extremely retarded combustion mode, control unit 25 determines whether or not throttle opening Th of electronically controlled throttle valve 7 is higher than threshold value $Th_1$. When the answer to step S34 is YES, the routine proceeds to step S36. On the other hand, when the answer to step S34 is NO, the routine proceeds to step S35. Thus, control unit 25 exits the extremely retarded combustion mode, even when catalyst temperature $T_B$ does not exceed second reference temperature $T_2$, if throttle opening Th exceeds threshold value $Th_1$.

In accordance with the above-mentioned process, the extremely retarded combustion mode is inhibited until catalyst temperature $T_B$ exceeds third reference temperature $T_3$. This is effective for avoiding thermal degradation of catalytic converter 10 while reducing the period of catalyst full activation in the extremely retarded combustion mode. In this embodiment, the combustion control apparatus may be constructed without catalytic converter outlet temperature sensor 32.

Step S34 in the routine of FIG. 12 may be replaced with step S25A concerning the auxiliary load, or step S25B concerning the idle switch signal, as the modifications of FIGS. 10 and 11.

Figure 13:
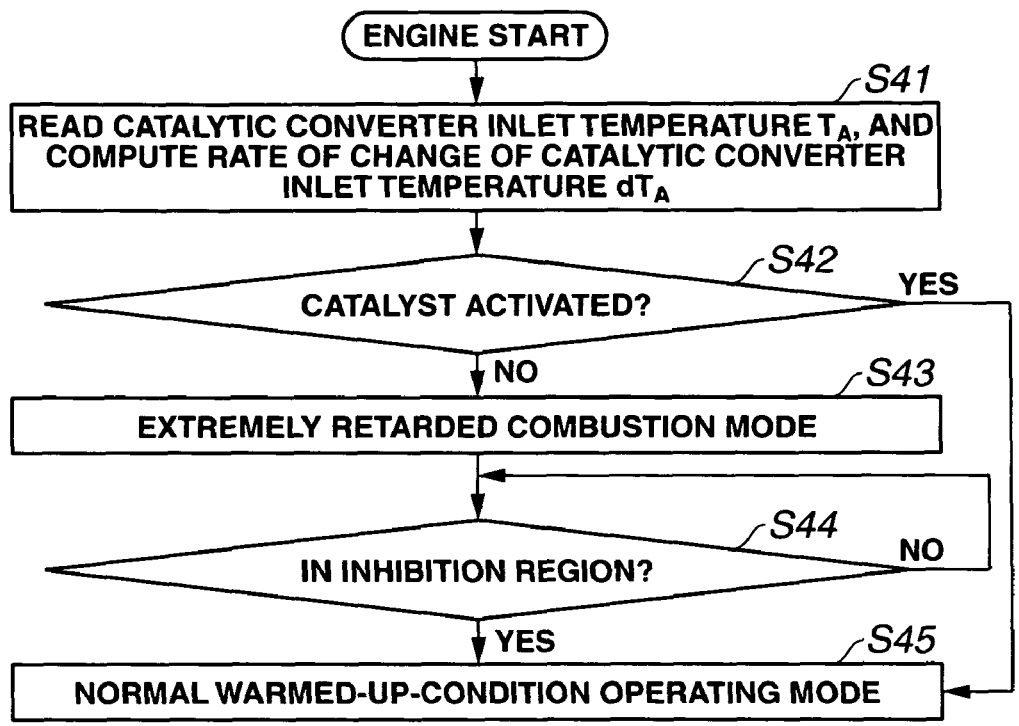
FIG. 13 is a flow chart showing a process of combustion mode shift for engine start in accordance with a fifth embodiment.

FIG. 13 is a flow chart showing a process of combustion mode shift for engine start in accordance with a fifth embodiment. As shown in FIG. 13, first, at step S41, control unit 25 reads a catalytic converter inlet temperature $T_A$ defined as the temperature of an inlet point of catalytic converter 10 which is measured by exhaust gas temperature sensor 13, and determines or computes the rate of change $dT_A$ of catalytic converter inlet temperature $T_A$, specifically the amount of change per unit time in catalytic converter inlet temperature $T_A$. Subsequent to step S41, at step S42, control unit 25 determines whether or not the catalyst is activated based on engine conditions such as a coolant temperature at engine start and catalytic converter inlet temperature $T_A$ at engine start. For example, during engine restart in warmed-up conditions, the catalyst is already activated. When the catalyst is activated, the routine proceeds to step S45. At step S45, control unit 25 operates the engine in the normal warmed-up condition operating mode, specifically in the homogeneous charge combustion mode, or in the normal stratified charge combustion mode.

On the other hand, when the catalyst is unactivated in such conditions as in cold start, the routine proceeds to step S43. At step S43, control unit 25 operates the engine in the extremely retarded combustion mode. Thereby, the exhaust gas temperature rises rapidly.

Figure 14:
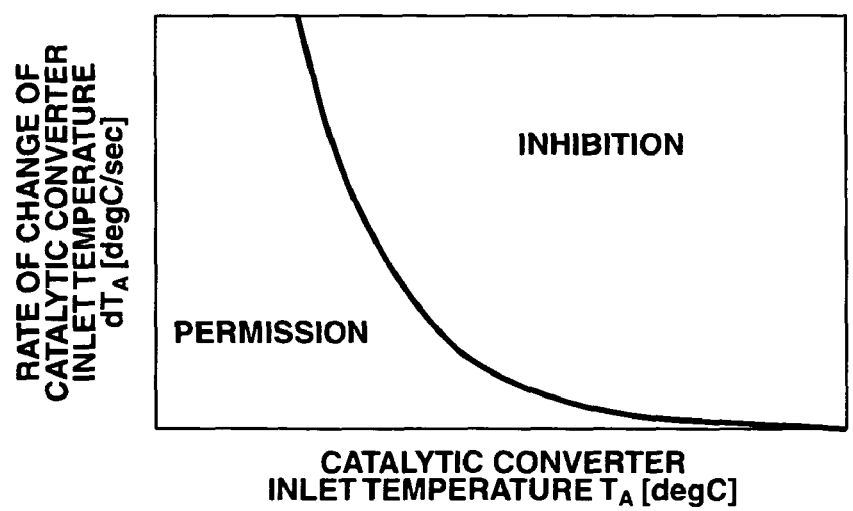
FIG. 14 is a characteristic diagram showing a permission region and an inhibition region for the extremely retarded combustion mode in the fifth embodiment.

Subsequent to step S43, at step S44, control unit 25 determines or judges based on catalytic converter inlet temperature $T_A$ and its rate of change $dT_A$ whether or not the thermal state of catalytic converter 10 has reached a predetermined stage before full activation. Specifically, control unit 25 judges whether the point indicative of catalytic converter inlet temperature $T_A$ and its rate of change $dT_A$ is in an inhibition region or a permission region of the graph as shown in FIG. 14. While the engine is in the permission region, control unit 25 continues the extremely retarded combustion mode until the engine enters the inhibition region. When control unit 25 judges that the engine enters the inhibition region, the routine proceeds to step S45, where the extremely retarded combustion mode is canceled and shifted into the normal warmed-up condition operating mode. The above-mentioned region of inhibition conditions is defined in such a manner that the catalyst temperature does not rise to excessively overshoot the full activation temperature after cancellation of the extremely retarded combustion mode. Specifically, the lowest value of catalytic converter inlet temperature $T_A$ at which the extremely retarded combustion mode is cancelled or inhibited decreases with increasing rate of change of catalytic converter inlet temperature $dT_A$. This prevents excessive overshoot of the catalyst temperature and heat strain due to extremely large spatial thermal gradients.

Figure 15:
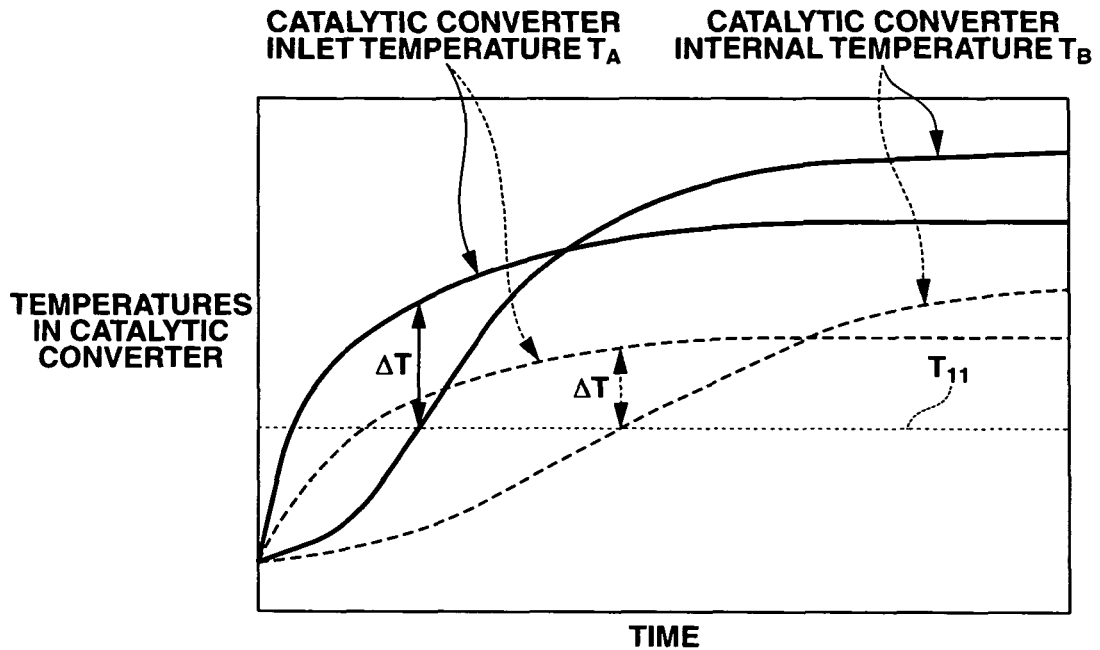
FIG. 15 is a graph showing changes in an inlet temperature and an internal temperature of a catalytic converter in case the extremely retarded combustion mode is employed, as contrasted with the case where a normal combustion mode is employed.

The following describes changes in temperatures in catalytic converter 10. FIG. 15 is a graph showing changes in catalytic converter inlet temperature $T_A$ (substantially identical to the exhaust gas temperature) and catalytic converter internal temperature $T_B$ in case the extremely retarded combustion mode continues after cold start, as contrasted with the case as indicated by broken lines where the normal combustion mode continues after cold start. As shown in FIG. 15, in the extremely retarded combustion mode, the exhaust gas temperature (catalytic converter inlet temperature) rises rapidly after cold start so that the internal temperature reaches a catalyst activation temperature (full activation temperature) $T_{11}$ within a very short period of time. On the other hand, the difference between the inlet temperature and internal temperature, namely the spatial thermal gradient in the catalyst carrier is lager at catalyst activation temperature $T_{11}$ in the case of the extremely retarded combustion mode as indicated by solid lines than in the case of mild heating as indicated by broken lines. Thus, in general, the rapid heating due to the extremely retarded combustion mode tends to cause a large amount of heat strain in catalytic converter 10.

Figure 16:
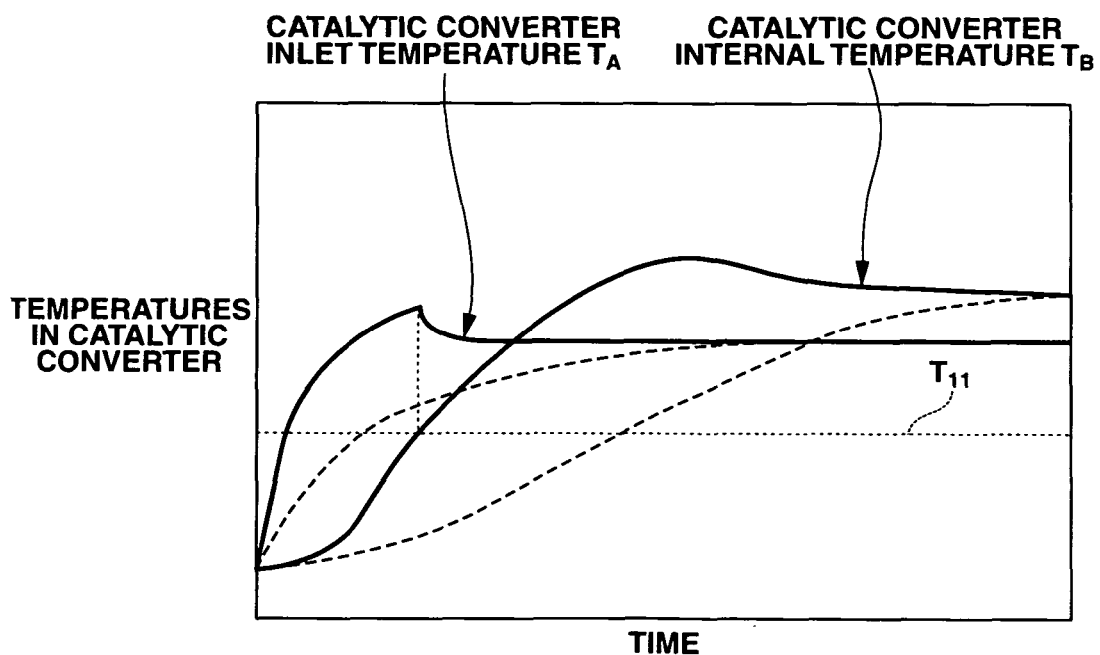
FIG. 16 is a graph showing changes in the catalytic converter inlet temperature and catalytic converter internal temperature in case the extremely retarded combustion mode is canceled when the catalytic internal temperature reaches its activation temperature.

On the other hand, FIG. 16 is a graph showing changes in the catalytic converter inlet temperature and catalytic converter internal temperature when catalytic internal temperature $T_B$ reaches catalyst activation temperature $T_{11}$ and the extremely retarded combustion mode is canceled. In this case, after cancellation of the extremely retarded combustion mode, the heat in components in upstream of the exhaust system and the reaction heat of the catalyst itself continue to raise the internal temperature of catalytic converter 10. As a result, it is possible that the internal temperature of catalytic converter 10 overshoots a temperature of degrading the catalyst.

Figure 17:
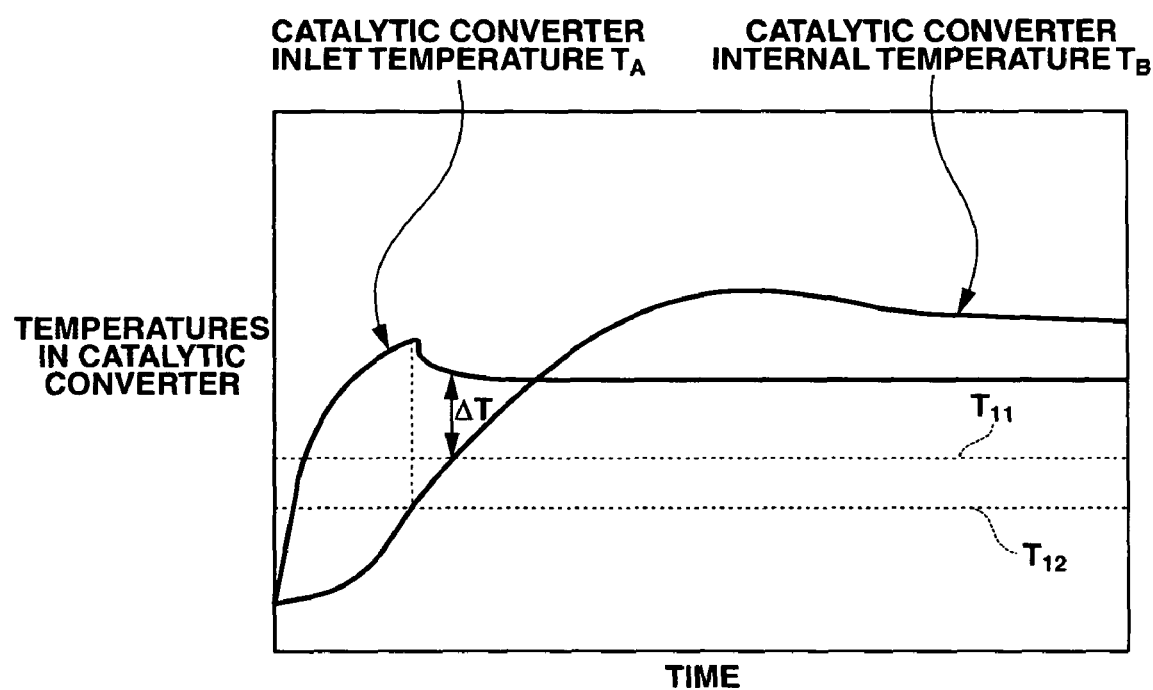
FIG. 17 is a graph showing changes in the catalytic converter inlet temperature and catalytic converter internal temperature in the fifth embodiment.

On the other hand, FIG. 17 is a graph showing changes in the catalytic converter inlet temperature and the catalytic converter internal temperature in the case of the fifth embodiment where the extremely retarded combustion mode is canceled before internal temperature $T_B$ reaches catalyst activation temperature $T_{11}$. The extremely retarded combustion mode is cancelled when the internal temperature is a temperature $T_{12}$ which is lower than catalyst activation temperature $T_{11}$, so that the internal temperature rises even after the cancellation of the extremely retarded combustion mode but does not reach the temperature of degrading the catalyst. After the cancellation of the extremely retarded combustion mode, catalytic converter inlet temperature $T_A$ decreases immediately, and the difference $\Delta T$ between internal temperature $T_B$ and catalytic converter inlet temperature $T_A$ when internal temperature $T_B$ reaches catalyst activation temperature $T_{11}$ is smaller than in the cases of FIGS. 15 and 16.

Although catalytic converter inlet temperature $T_A$ of catalytic converter 10 is measured directly by exhaust gas temperature sensor 13 in the above-mentioned embodiment, catalytic converter inlet temperature $T_A$ may be estimated in accordance with the intake air quantity since catalytic converter inlet temperature $T_A$ is correlated with the intake air quantity of the internal combustion engine.

Figure 18:
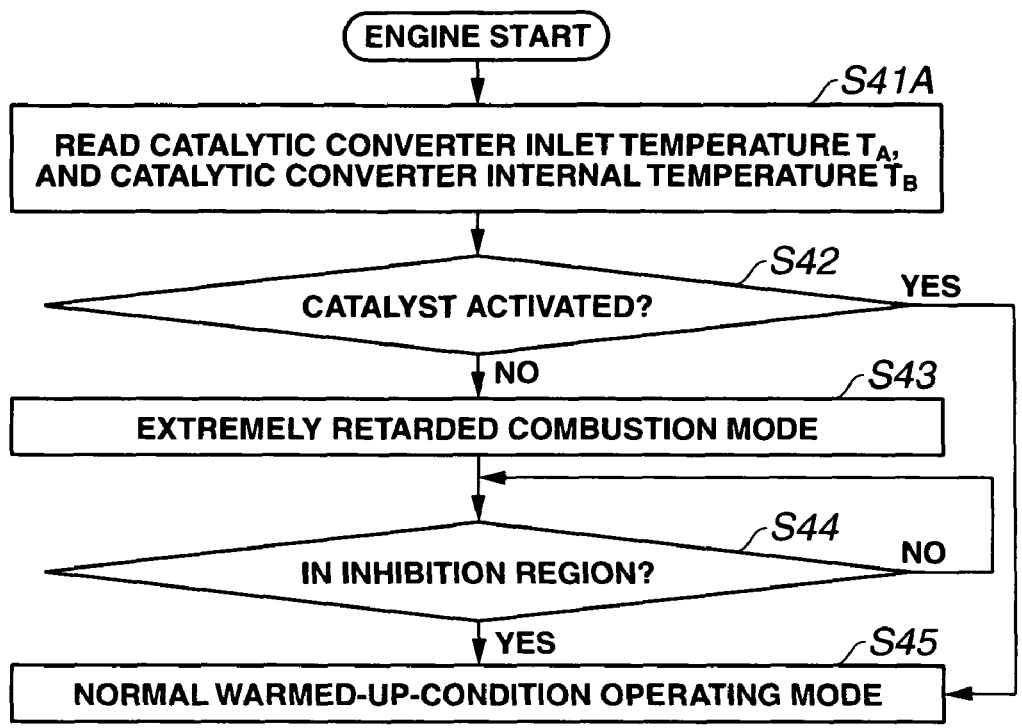
FIG. 18 is a flow chart showing a process of combustion mode shift for engine start in accordance with a sixth embodiment.
Figure 19:
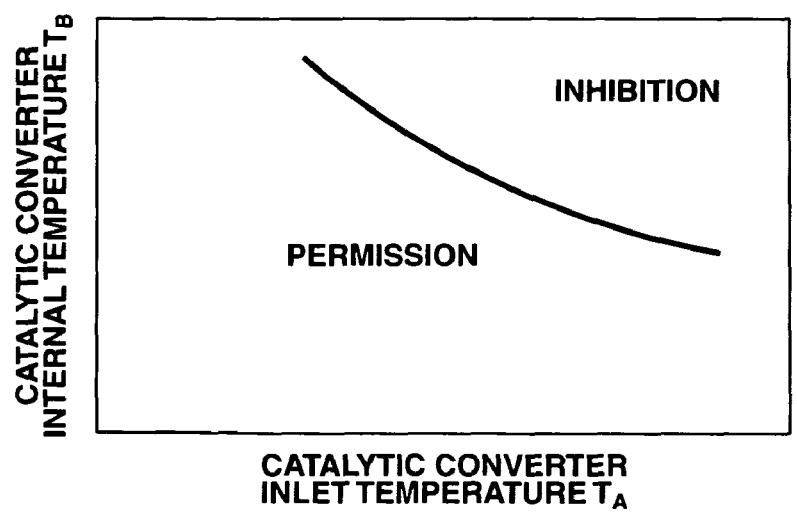
FIG. 19 is a graph showing a permission region and an inhibition region for the extremely retarded combustion mode in the sixth embodiment.

FIGS. 18 and 19 show a sixth embodiment. In the sixth embodiment, the thermal state of catalytic converter 10 is determined by means of both exhaust gas temperature sensor 13 and catalyst temperature sensor 31. That is, catalytic converter inlet temperature $T_A$ and internal temperature $T_B$ of catalytic converter 10 are both measured.

FIG. 18 is a flow chart showing a process of combustion mode shift for engine start in accordance with the sixth embodiment. As shown in FIG. 18, first, at step S41A, control unit 25 reads catalytic converter inlet temperature $T_A$ of catalytic converter 10 measured by exhaust gas temperature sensor 13 and internal temperature $T_B$ of catalytic converter 10 measured by catalyst temperature sensor 31. Subsequent to step S41A, at step S42, control unit 25 determines whether or not the catalyst is activated based on engine conditions such as the coolant temperature at engine start and internal temperature $T_B$ at engine start. For example, during engine restart in warmed-up conditions, the catalyst is already activated. When the catalyst is activated, the routine proceeds to step S45. At step S45, control unit 25 operates the engine in the normal warmed-up condition operating mode, namely in the homogeneous charge combustion mode, or in the normal stratified charge combustion mode.

On the other hand, when the catalyst is unactivated in such conditions as in cold start, the routine proceeds to step S43. At step S43, control unit 25 operates the engine in the extremely retarded combustion mode. Thereby, the exhaust gas temperature rises rapidly.

Subsequent to step S43, at step S44, control unit 25 determines or judges based on catalytic converter inlet temperature $T_A$ and catalytic converter internal temperature $T_B$ whether or not the thermal state of catalytic converter 10 has reached a predetermined stage before full activation. Specifically, control unit 25 judges whether the point of catalytic converter inlet temperature $T_A$ and catalytic converter internal temperature $T_B$ is in an inhibition region or a permission region of the graph as shown in FIG. 19. While the engine in the permission region, control unit 25 continues the extremely retarded combustion mode until the engine enters the inhibition region. When control unit 25 judges that the engine enters the inhibition region, the routine proceeds to step S45, where the extremely retarded combustion mode is canceled and shifted into the normal combustion mode. The above-mentioned region of inhibition conditions is defined in such a manner that the catalyst temperature does not rise to excessively overshoot the full activation temperature after cancellation of the extremely retarded combustion mode. Specifically, the lowest value of catalytic converter internal temperature $T_B$ at which the extremely retarded combustion mode is cancelled or inhibited decreases with increasing catalytic converter inlet temperature $T_A$. This prevents excessive overshoot of the catalyst temperature and heat strain due to extremely large spatial thermal gradients.

Although the catalytic converter inlet temperature $T_A$ of catalytic converter 10 is measured directly by exhaust gas temperature sensor 13 in the above-mentioned embodiment, the catalytic converter inlet temperature $T_A$ may be estimated in accordance with the intake air quantity since catalytic converter inlet temperature $T_A$ is correlated with the intake air quantity of the internal combustion engine.

Although the internal temperature $T_B$ of catalytic converter 10 is measured directly by catalyst temperature sensor 31 in the above-mentioned embodiment, the internal temperature $T_B$ may be estimated in accordance with other parameters such as the oxygen storage ability of catalytic converter 10 which is correlated with the catalyst temperature. Specifically, in order to determine the thermal state of catalytic converter 10, the exhaust air-fuel ratio of the internal combustion engine is controlled to fluctuate in a suitable period and amplitude as shown in FIG. 20A. This control is implemented by general technology of air-fuel ratio feedback control. The air-fuel ratio measured by upstream air-fuel ratio sensor 11 changes in accordance with the exhaust air-fuel ratio of the engine. On the other hand, the air-fuel ratio measured by downstream air-fuel ratio sensor 12 changes as shown in FIG. 20B, in which the air-fuel ratio changes similarly as the air-fuel ratio signal of air-fuel ratio sensor 11 when catalytic converter 10 is unactivated and has a lower oxygen storage ability, and the air-fuel ratio changes in a long period and small amplitude when the temperatures of catalytic converter 10 rise and catalytic converter 10 has a high oxygen storage ability. Identifying these different modes of change, control unit 25 judges that the catalyst temperature reaches the lowest activation temperature before full activation.

In the extremely retarded combustion mode, fuel is injected at or near TDC in which piston 2 is at or near its upper end. That is, fuel is injected into combustion chamber 3 at the moment its volume is small. This tends to increase flows of the fuel spray on the walls of combustion chamber 3, namely on the side wall of the cylinder and the piston crown. Accordingly, while the engine is in a clod state just after cold start in which the incylinder temperature (or the temperature of walls of combustion chamber 3) is very low, the increase of the fuel wall flows tends to increase unburned HC. Further, while the engine is in such a clod state just after cold start, the exhaust gas temperature is also low so that it is possible that unburned HC from combustion chamber 3 is not fully oxidized in the exhaust system and thereby is exhausted outside.

Figure 23:
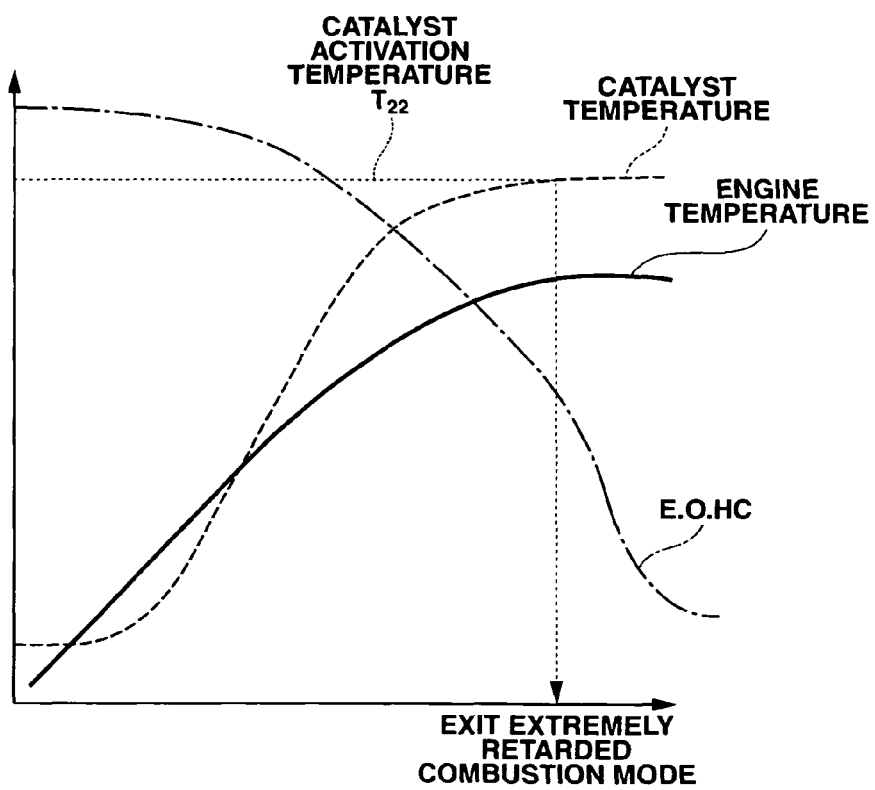
FIG. 23 is a graph showing changes in the engine temperature, the catalyst temperature, and the quantity of engine-out HC emissions in cold start in a reference example in which the extremely retarded combustion is continuously employed immediately after engine start.
Figure 24:
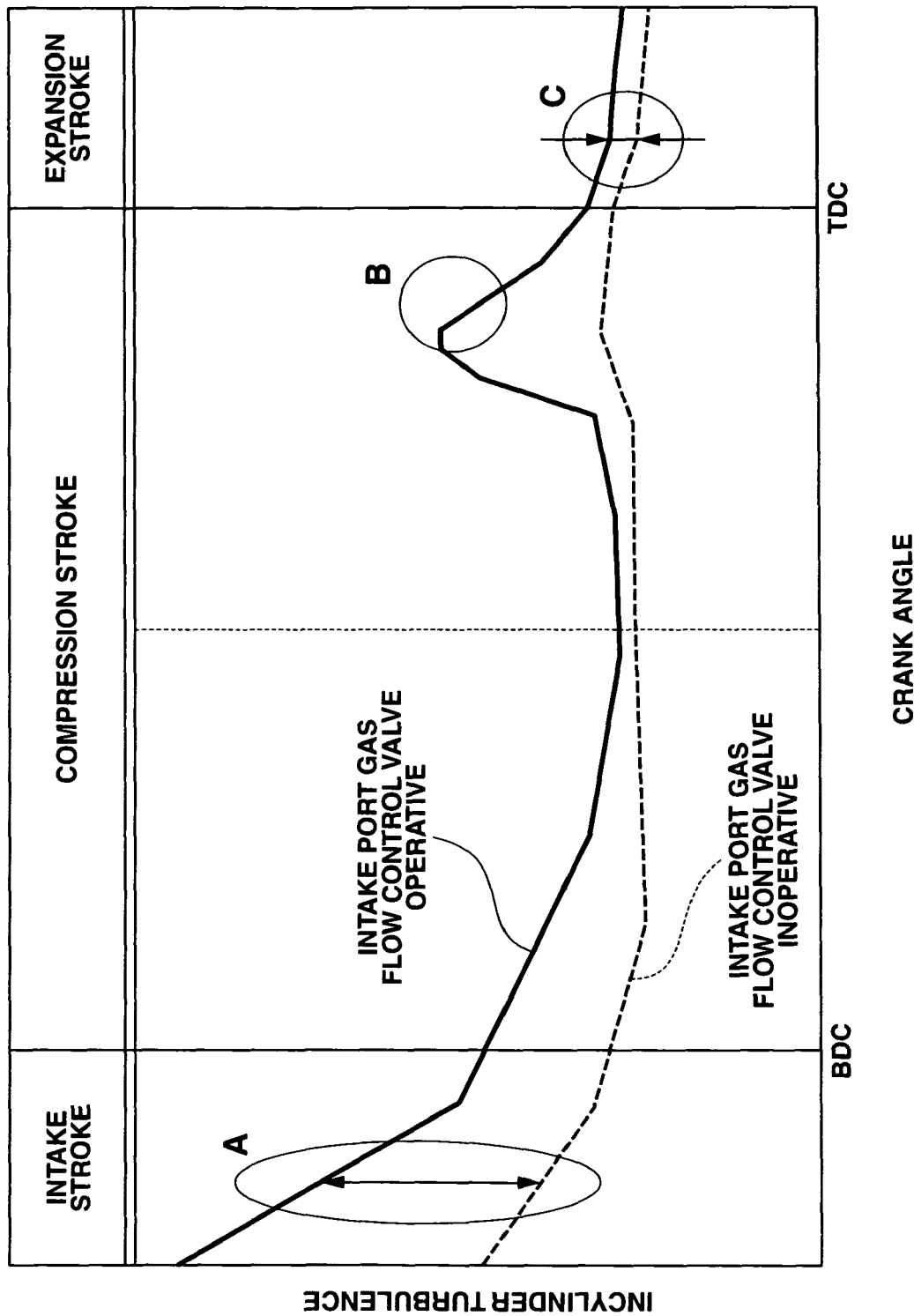
FIG. 24 is a graph showing changes in incylinder turbulence in related technology.

FIG. 23 is a graph showing changes in the engine temperature (coolant temperature or lubricating oil temperature), the catalyst temperature, and the generated quantity of HC (called engine-out HC emissions) in cold start in a reference example in which the extremely retarded combustion is continuously employed immediately after engine start. As shown in FIG. 23, the engine temperature gradually increases with time after engine start. The catalyst temperature of catalytic converter 10 also immediately and gradually increases effectively heated by the extremely retarded combustion. The quantity of engine-out HC emissions is large due to increase of the fuel wall flows just after cold start, and decreases with increase in the engine temperature.

In a seventh embodiment, control unit 25 inhibits the extremely retarded combustion mode while the engine is in a predetermined low thermal state. Specifically, control unit 25 inhibits the extremely retarded combustion mode after cold start while the engine temperature is in a predetermined cold state, i.e. until the engine temperature exceeds a predetermined first threshold temperature $T_{21}$, as shown in FIG. 21. During this initial period, the engine is operated in the normal cold condition operating mode. The normal cold condition operating mode serves to increase the exhaust gas temperature without increasing the wall flows of the fuel spray. In case catalytic converter 10 is in a completely cold state where the catalyst temperature is at or near the outside atmosphere temperature, the normal cold condition operating mode also serves to gradually warm up catalytic converter 10 by the heat of the exhaust gas. In case the normal cold condition operating mode is employed just after cold start, the wall flows of the fuel spray is in a lower level, and thereby the quantity of engine-out HC emissions is smaller than in the case of FIG. 23.

When the engine temperature rises to first threshold temperature $T_{21}$, control unit 25 initiates or enters the extremely retarded combustion mode. In the extremely retarded combustion mode, the exhaust gas temperature rapidly increases to heat catalytic converter 10. When catalytic converter 10 is activated, the temperature of catalytic converter 10 further rapidly rises. As shown in FIG. 21, the quantity of engine-out HC emissions temporarily and slightly increases just after the entrance into the extremely retarded combustion mode, and rapidly decreases with increase in the engine temperature.

Figure 22:
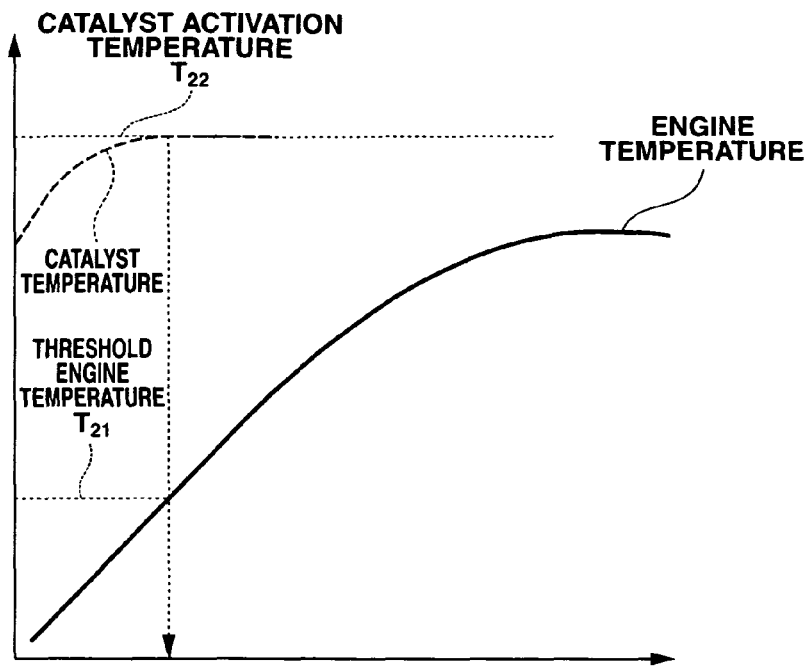
FIG. 22 is a graph showing changes in the engine temperature, the catalyst temperature, and the quantity of engine-out HC emissions in cold start in case the catalyst temperature reaches a predetermined temperature $T_{22}$ before the engine temperature exceeds a predetermined temperature $T_{21}$.

When the temperature of catalytic converter 10 which is measured or estimated based on the sensing signal of catalyst temperature sensor 13 exceeds a predetermined second threshold temperature $T_{22}$, control unit 25 terminates the extremely retarded combustion mode and enters the normal warmed-up condition operating mode which includes the homogeneous charge combustion mode and the stratified charge combustion mode. Second threshold temperature $T_{22}$ is substantially identical to a catalyst activation temperature of catalytic converter 10. As shown in FIG. 22, if the temperature of catalytic converter 10 reaches or exceeds second threshold temperature $T_{22}$ before the engine temperature exceeds first threshold temperature $T_{21}$, the initiating the extremely retarded combustion mode is inhibited, that is, the normal cold condition operating mode is not switched to the extremely retarded combustion mode but directly to the normal warmed-up condition operating mode. This avoids adverse effects in fuel consumption due to the extremely retarded combustion mode.

The combustion control apparatus in accordance with the above-mentioned seventh embodiment wherein the extremely retarded combustion mode is employed after the engine temperature exceeds first threshold temperature $T_{21}$, is effective for preventing the quantity of engine-out HC emissions from transiently and excessively increasing due to the increase in the wall flows of the fuel spray in cold start. When employed, the extremely retarded combustion mode serves to rapidly raise the exhaust gas temperature and thereby to rapidly raise the temperature of catalytic converter 10, so that the period required for catalyst activation is comparable to that in the case where the extremely retarded combustion mode is used just after cold start as shown in FIG. 23.

As mentioned above, the exhaust gas temperature is very high in the extremely retarded combustion mode. Accordingly, in case the extremely retarded combustion mode is employed just after cold start in which catalytic converter 10 is in a completely cold state, it is possible that catalytic converter 10 is rapidly heated, and that thermal strain is generated in catalytic converter 10. The combustion control apparatus in accordance with this embodiment wherein the extremely retarded combustion mode is entered after catalytic converter 10 is heated above a predetermined level, is effective for reducing the period required for full activation of the catalyst and for avoiding large thermal strain or thermal degradation of catalytic converter 10.

The extremely retarded combustion mode of the above-mentioned embodiments may be employed in an engine system including a NOx trap catalyst as catalytic converter 10 to recover sulfur poisoning thereof. A NOx trap catalyst serves to adsorb NOx when the air-fuel ratio of the exhaust gas flowing into the catalyst is lean, and to perform a purifying process by releasing the adsorbed NOx when the exhaust air-fuel ratio is rich. When the sulfur content (SOx) in fuel is combined with a NOx trap catalyst, the NOx trap catalyst is degraded in the performance of NOx adsorption. In order to remove SOx from a NOx trap catalyst (sulfur poisoning recovery), the extremely retarded combustion of the shown embodiments may be employed to obtain the exhaust gas of high temperatures.

This application is based on prior Japanese Patent Application Nos. 2005-185909 filed on Jun. 27, 2005, 2005-158507 filed on May 31, 2005, 2005-158509 filed on May 31, 2005, and 2005-158510 filed on May 31, 2005. The entire contents of these Japanese Patent Application Nos. 2005-185909, 2005-158507, 2005-158509, and 2005-158510 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A combustion control apparatus for an internal combustion engine, comprising:
   a fuel injector configured to inject fuel into a combustion chamber of the internal combustion engine at a fuel injection timing;
   a spark plug configured to produce a spark in the combustion chamber at an ignition timing; and
   a control unit connected to the fuel injector and the spark plug and configured to perform the following in an extremely retarded combustion mode while the internal combustion engine is in a predetermined operating state:
   setting the ignition timing to be after compression top dead center; and
   setting the fuel injection timing to be before the ignition timing and after compression top dead center,
   the control unit being configured to inhibit the extremely retarded combustion mode from an engine start until an exhaust purifier of the internal combustion engine passes a predetermined cold state.

2. The combustion control apparatus as claimed in claim 1, wherein the control unit is configured to inhibit the extremely retarded combustion mode while a temperature of the exhaust purifier is below its lowest activation temperature.

3. The combustion control apparatus as claimed in claim 1, wherein the control unit is configured to inhibit the extremely retarded combustion mode while an exhaust gas temperature at an outlet point of the exhaust purifier is below a predetermined temperature value.

4. The combustion control apparatus as claimed in claim 1, wherein the control unit is configured to perform the following in the extremely retarded combustion mode:
   controlling the fuel injector to inject fuel at the fuel injection timing as a second fuel injection timing, and at a prior fuel injection timing during intake and compression strokes; and
   retarding the second fuel injection timing gradually to a predetermined timing point in an initial stage of the extremely retarded combustion mode.

5. The combustion control apparatus as claimed in claim 1, wherein the predetermined operating state of the internal combustion engine is a state in which a request to raise an exhaust gas temperature of the internal combustion engine is active.

6. The combustion control apparatus as claimed in claim 1, wherein the control unit is configured to set the ignition timing within a range of 15 to 30 degrees crank angle after top dead center in the extremely retarded combustion mode.

7. The combustion control apparatus as claimed in claim 1, wherein the control unit is configured to control an air-fuel ratio of the internal combustion engine to be stoichiometric or slightly leaner in the extremely retarded combustion mode.

8. The combustion control apparatus as claimed in claim 1, wherein the control unit is configured to inhibit the extremely retarded combustion mode while an engine temperature of the internal combustion engine is in a predetermined cold state.

9. The combustion control apparatus as claimed in claim 8, wherein the control unit is configured to initiate the extremely retarded combustion mode when the engine temperature exceeds a predetermined temperature value, and configured to inhibit the initiating when a temperature of the exhaust purifier reaches a catalyst activation temperature value before the engine temperature exceeds the predetermined temperature value.

10. The combustion control apparatus as claimed in claim 1, wherein the control unit is configured to inhibit the extremely retarded combustion mode while an engine load of the internal combustion engine is above a predetermined level.

11. The combustion control apparatus as claimed in claim 10, wherein the control unit is configured to determine the engine load in accordance with an accelerator opening of the internal combustion engine.

12. The combustion control apparatus as claimed in claim 10, wherein the control unit is configured to determine the engine load in accordance with an operating state of auxiliary equipment of the internal combustion engine.

13. The combustion control apparatus as claimed in claim 10, wherein the control unit is configured to inhibit the extremely retarded combustion mode while the internal combustion engine is in a non-idling state.

14. The combustion control apparatus as claimed in claim 1, wherein the control unit is configured to inhibit the extremely retarded combustion mode while a thermal state of the exhaust purifier is in a predetermined inhibition region before full activation.

15. The combustion control apparatus as claimed in claim 14, wherein the predetermined inhibition region is defined in such a manner that the lowest value of an inlet temperature of the exhaust purifier decreases with increasing rate of change of the inlet temperature.

16. The combustion control apparatus as claimed in claim 14, wherein the predetermined inhibition region is defined in such a manner that the lowest value of an inlet temperature of the exhaust purifier decreases with increase in an internal temperature of the exhaust purifier.

17. The combustion control apparatus as claimed in claim 16, wherein the control unit is configured to estimate the inlet temperature of the exhaust purifier in accordance with an intake air quantity of the internal combustion engine.

18. The combustion control apparatus as claimed in claim 16, wherein the control unit is configured to estimate the internal temperature of the exhaust purifier in accordance with an oxygen storage ability of the exhaust purifier.

19. A combustion control apparatus for an internal combustion engine, comprising:
fuel injection means for injecting fuel into a combustion chamber of the internal combustion engine at a fuel injection timing;
spark means for producing a spark in the combustion chamber at an ignition timing; and
control means for performing the following in an extremely retarded combustion mode while the internal combustion engine is in a predetermined operating state:
setting the ignition timing to be after compression top dead center; and
setting the fuel injection timing to be before the ignition timing and after compression top dead center, and
the control means being configured to inhibit the extremely retarded combustion mode from an engine start until an exhaust purifier of the internal combustion engine passes a predetermined cold state.

20. A method of controlling an internal combustion engine including a fuel injector configured to inject fuel into a combustion chamber of the internal combustion engine at a fuel injection timing, and a spark plug configured to produce a spark in the combustion chamber at an ignition timing, the method comprising:
performing the following in an extremely retarded combustion mode while the internal combustion engine is in a predetermined operating state:
setting the ignition timing to be after compression top dead center; and
setting the fuel injection timing to be before the ignition timing and after compression top dead center; and
inhibiting the extremely retarded combustion mode from an engine start until an exhaust purifier of the internal combustion engine passes a predetermined cold state.

21. A combustion control apparatus for an internal combustion engine, comprising:
a fuel injector configured to inject fuel into a combustion chamber of the internal combustion engine at a fuel injection timing;
a spark plug configured to produce a spark in the combustion chamber at an ignition timing; and
a control unit connected to the fuel injector and the spark plug and configured to perform the following in an extremely retarded combustion mode while the internal combustion engine is in a predetermined operating state:
setting the ignition timing to be after compression top dead center; and
setting the fuel injection timing to be before the ignition timing and after compression top dead center,
the control unit being configured to inhibit the extremely retarded combustion mode from an engine start until an exhaust gas temperature at an outlet point of an exhaust purifier of the internal combustion engine passes a predetermined temperature value.

\* \* \* \* \*